US011845347B2

(12) United States Patent
Copeland

(10) Patent No.: US 11,845,347 B2
(45) Date of Patent: Dec. 19, 2023

(54) PRECISION CHARGING CONTROL OF AN UNTETHERED VEHICLE WITH A MODULAR VEHICLE CHARGING ROADWAY

(71) Applicant: David Alan Copeland, Orlando, FL (US)

(72) Inventor: David Alan Copeland, Orlando, FL (US)

( * ) Notice: Subject to any disclaimer, the term of this patent is extended or adjusted under 35 U.S.C. 154(b) by 0 days.

(21) Appl. No.: 17/743,165

(22) Filed: May 12, 2022

(65) Prior Publication Data

US 2022/0363149 A1 Nov. 17, 2022

Related U.S. Application Data

(63) Continuation-in-part of application No. 17/739,928, filed on May 9, 2022.
(Continued)

(51) Int. Cl.
*B60L 53/126* (2019.01)
*H02J 50/10* (2016.01)
(Continued)

(52) U.S. Cl.
CPC ............. *B60L 53/126* (2019.02); *B60L 5/005* (2013.01); *B60L 50/53* (2019.02); *B60L 53/12* (2019.02);
(Continued)

(58) Field of Classification Search
CPC ...... B60L 53/12; B60L 53/124; B60L 53/122; B60L 53/126; B60L 5/005; B60L 50/53;
(Continued)

(56) References Cited

U.S. PATENT DOCUMENTS 527,857 A 10/1894 Hutin et al.
1,456,258 A 5/1923 Stoner
(Continued)

FOREIGN PATENT DOCUMENTS

CN 209409702 9/2019 ............. B60B 27/00
DE 10 2019 208 485 8/2020 ............. B60C 23/00
(Continued)

OTHER PUBLICATIONS

ABB, https://new.abb.com/ev-charging, accessed Jun. 3, 2022, 3 pgs.
(Continued)

*Primary Examiner* — Richard Isla
*Assistant Examiner* — Manuel Hernandez
(74) *Attorney, Agent, or Firm* — HAYES SOLOWAY P.C.

(57) ABSTRACT

Methods and systems for precision charging control of an untethered vehicle include at least a wireless charging antenna carried by a vehicle and in electrical communication with a vehicle propulsion system. A plurality of wireless charging antennae is positioned on or within a roadway and are in communication with at least a roadway control system and a power source. An authentication connection is established between the vehicle wireless charging antenna and the roadway control system. A dynamic seek operation is triggered between the first wireless charging antenna and the one of the plurality of second wireless charging antennae to pair the first wireless charging antenna with the one of the plurality of second wireless charging antennae. A quantity of electrical energy is transferred between the first wireless charging antenna and the one of the plurality of second wireless charging antennae.

15 Claims, 16 Drawing Sheets

Related U.S. Application Data

(60) Provisional application No. 63/187,523, filed on May 12, 2021.

(51) Int. Cl.
| | | |
|---|---|---|
| *H02J 50/40* | (2016.01) | |
| *B60L 5/00* | (2006.01) | |
| *H02J 50/00* | (2016.01) | |
| *H02J 50/90* | (2016.01) | |
| *H02J 50/80* | (2016.01) | |
| *B60L 50/53* | (2019.01) | |
| *B60L 53/12* | (2019.01) | |
| *B60L 53/122* | (2019.01) | |

(52) U.S. Cl.
CPC .......... *B60L 53/122* (2019.02); *H02J 50/005* (2020.01); *H02J 50/10* (2016.02); *H02J 50/402* (2020.01); *H02J 50/80* (2016.02); *H02J 50/90* (2016.02)

(58) Field of Classification Search
CPC ........ H02J 50/005; H02J 50/10; H02J 50/402; H02J 50/80; H02J 50/90
USPC .................................................. 320/108, 109
See application file for complete search history.

(56) References Cited

U.S. PATENT DOCUMENTS

| | | | | |
|---|---|---|---|---|
| 2,090,089 | A | 8/1937 | Wiegand | 152/11 |
| 3,578,015 | A | 5/1971 | Milliken | 152/210 |
| 3,987,409 | A | 10/1976 | Freeman | 340/134 |
| 4,042,308 | A | 8/1977 | Freedman | 404/1 |
| 4,196,414 | A | 4/1980 | Muller | 340/58 |
| 4,641,698 | A | 2/1987 | Bitonti | 152/416 |
| 4,836,344 | A * | 6/1989 | Bolger | H02J 50/10 191/10 |
| 4,881,153 | A | 11/1989 | Scott | 362/78 |
| 5,007,303 | A | 4/1991 | Okuzumi | 74/573 |
| 5,313,996 | A | 5/1994 | Bragg | 152/427 |
| 5,392,200 | A | 2/1995 | Milde | 362/78 |
| 5,548,274 | A | 8/1996 | Anderson et al. | 340/468 |
| 5,583,482 | A | 12/1996 | Chamussy et al. | 340/442 |
| 5,664,534 | A | 9/1997 | Schmitz | 123/192.1 |
| 5,683,164 | A | 11/1997 | Chien | 362/78 |
| 5,800,035 | A | 9/1998 | Aichele | 362/31 |
| 6,145,559 | A | 11/2000 | Ingram, II | 152/417 |
| 6,286,565 | B1 | 9/2001 | Pike | 141/38 |
| 6,350,963 | B1 | 2/2002 | Gray | 219/202 |
| 6,363,985 | B1 | 4/2002 | Beesley | 152/415 |
| 6,484,774 | B1 | 11/2002 | Naedler | 152/417 |
| 6,601,979 | B1 | 8/2003 | Byrd et al. | 362/500 |
| 6,644,839 | B2 | 11/2003 | Lee | 362/500 |
| 6,817,743 | B2 | 11/2004 | Sharper | 362/500 |
| 7,079,042 | B2 | 7/2006 | Reim | 340/815.45 |
| 7,302,837 | B2 | 12/2007 | Wendte | 73/146.5 |
| 7,334,462 | B2 | 2/2008 | Robert | 73/146 |
| 7,377,676 | B2 | 5/2008 | Thomas et al. | 362/500 |
| 7,458,648 | B2 | 12/2008 | Esposito et al. | 301/65 |
| 7,513,282 | B1 | 4/2009 | Shoner | 152/510 |
| 7,611,267 | B2 | 11/2009 | Cooper | 362/500 |
| 7,712,842 | B2 | 5/2010 | Parker et al. | 301/108.1 |
| 7,741,963 | B2 | 6/2010 | Tsai | 340/442 |
| 8,322,901 | B2 | 12/2012 | Michelotti | 362/500 |
| 8,328,294 | B2 | 12/2012 | Byers et al. | 301/37.25 |
| 8,714,869 | B1 | 5/2014 | Ries et al. | 404/79 |
| 8,833,533 | B2 | 9/2014 | Suh et al. | B60L 11/1816 |
| 8,839,667 | B2 | 9/2014 | Kempf | B60C 23/0408 |
| 8,975,864 | B2 | 3/2015 | Kim | B60L 11/182 |
| 8,997,955 | B2 | 4/2015 | Czainski et al. | B60L 9/00 |
| 9,045,013 | B2 | 6/2015 | Fink | B60C 27/045 |
| 9,131,120 | B2 | 9/2015 | Schofield et al. | H04N 7/18 |
| 9,150,060 | B2 | 10/2015 | Fink | B60C 27/045 |
| 9,190,028 | B2 | 11/2015 | Gilbert et al. | G09G 5/36 |
| 9,248,707 | B2 | 2/2016 | Zhou et al. | B60C 23/003 |
| 9,296,304 | B2 | 3/2016 | Krause | B60L 11/182 |
| 9,310,843 | B2 | 4/2016 | Shedletsky et al. | G06F 1/1637 |
| 9,409,455 | B2 | 8/2016 | Fink | B60C 27/045 |
| 9,446,638 | B2 | 9/2016 | Tanno | B60C 29/02 |
| 9,446,674 | B2 | 9/2016 | Halker et al. | B60L 11/182 |
| 9,469,165 | B2 | 10/2016 | Hibbler et al. | B60C 23/003 |
| 9,499,016 | B2 | 11/2016 | Deniau et al. | B60C 23/0494 |
| 9,522,577 | B2 | 12/2016 | Dilisio et al. | B60C 23/003 |
| 9,527,253 | B2 | 12/2016 | Gong et al. | B29D 30/0606 |
| 9,586,449 | B2 | 3/2017 | Love | B60C 99/003 |
| 9,630,506 | B2 | 4/2017 | Vietzke et al. | B60L 5/005 |
| 9,694,633 | B2 | 7/2017 | Chen | B60C 23/10 |
| 9,757,979 | B2 | 9/2017 | Meggiolan et al. | B60B 21/00 |
| 9,862,277 | B2 | 1/2018 | Dames et al. | B60L 5/005 |
| 10,059,154 | B2 | 8/2018 | Tanno | B60C 23/002 |
| 10,059,213 | B2 | 8/2018 | Ricci | H02J 7/00 |
| 10,144,254 | B2 | 12/2018 | Richardson | B60C 23/12 |
| 10,245,908 | B2 | 4/2019 | Richardson | B60C 23/10 |
| 10,259,272 | B2 | 4/2019 | Sidders et al. | B60C 23/003 |
| 10,325,717 | B2 * | 6/2019 | Boys | B60L 53/12 |
| 10,343,457 | B2 | 7/2019 | Gong et al. | B60C 5/24 |
| 10,406,869 | B2 | 9/2019 | Richardson | B60C 23/004 |
| 10,464,477 | B2 | 11/2019 | Maeda et al. | B60Q 3/14 |
| 10,476,323 | B2 | 11/2019 | Klassen | H02K 1/20 |
| 10,493,804 | B2 | 12/2019 | Fink | B60C 11/1612 |
| 10,493,808 | B1 | 12/2019 | McCauley et al. | B60C 23/003 |
| 10,590,629 | B2 | 3/2020 | Imaizumi et al. | E02F 9/245 |
| 10,644,578 | B2 | 5/2020 | Hunter et al. | H02K 16/04 |
| 10,647,163 | B2 | 5/2020 | Matsumoto | B60C 11/1675 |
| 10,661,620 | B2 | 5/2020 | Wilkinson | B60C 99/003 |
| 10,967,740 | B2 | 4/2021 | Dames et al. | B60L 5/005 |
| 11,047,702 | B1 | 6/2021 | Meyer et al. | G01C 21/3632 |
| 11,054,861 | B2 | 7/2021 | Bushnell | G06F 1/1652 |
| 11,054,932 | B2 | 7/2021 | Xu et al. | G06F 3/0416 |
| 11,076,261 | B1 | 7/2021 | Meyer et al. | H04W 4/026 |
| 11,100,909 | B2 | 8/2021 | Verweij et al. | G10K 11/17827 |
| 11,129,029 | B2 | 9/2021 | Eckert et al. | H04W 16/14 |
| 11,138,873 | B1 | 10/2021 | Clifford | G08G 1/017 |
| 11,186,187 | B1 * | 11/2021 | Sobota Rodriguez | H02J 50/402 |
| 2003/0202356 | A1 | 10/2003 | Hung | 362/500 |
| 2004/0257825 | A1 | 12/2004 | Choi et al. | 362/500 |
| 2005/0161137 | A1 | 7/2005 | Hoang | 152/415 |
| 2005/0174308 | A1 | 8/2005 | Matlock et al. | 345/82 |
| 2005/0257872 | A1 | 11/2005 | Szykulski | 152/417 |
| 2007/0058384 | A1 | 3/2007 | Khan | 362/500 |
| 2007/0274085 | A1 | 11/2007 | Hampton | 362/500 |
| 2008/0043099 | A1 | 2/2008 | Stein et al. | 348/118 |
| 2008/0101053 | A1 | 5/2008 | Hoffman et al. | 362/35 |
| 2008/0185086 | A1 | 8/2008 | Ingram et al. | 152/417 |
| 2008/0212334 | A1 | 9/2008 | Hickman et al. | 362/500 |
| 2009/0165912 | A1 | 7/2009 | Collette et al. | 152/210 |
| 2009/0283190 | A1 | 11/2009 | Padula et al. | 152/417 |
| 2009/0314407 | A1 | 12/2009 | Browne et al. | 152/527 |
| 2010/0207445 | A1 | 8/2010 | Medley et al. | 301/5.24 |
| 2010/0230197 | A1 | 9/2010 | Ortmann et al. | B60G 17/0195 |
| 2011/0162773 | A1 | 7/2011 | Gonska et al. | 152/418 |
| 2011/0221261 | A1 | 9/2011 | Eaton et al. | 301/5.24 |
| 2012/0067482 | A1 | 3/2012 | Stech | 152/415 |
| 2012/0069185 | A1 | 3/2012 | Stein | 348/148 |
| 2012/0152422 | A1 | 6/2012 | Rogers | 152/427 |
| 2012/0200707 | A1 | 8/2012 | Stein et al. | 348/148 |
| 2012/0305126 | A1 | 12/2012 | Merrill | 141/1 |
| 2012/0314071 | A1 | 12/2012 | Rosenbaum et al. | 348/148 |
| 2012/0318422 | A1 | 12/2012 | Lloyd | 152/417 |
| 2013/0000807 | A1 | 1/2013 | Pons et al. | 152/210 |
| 2013/0024059 | A1 * | 1/2013 | Miller | B60L 53/30 320/108 |
| 2013/0076112 | A1 | 3/2013 | Tho | 301/110.5 |
| 2013/0087262 | A1 | 4/2013 | Hennig | 152/417 |
| 2013/0119928 | A1 | 5/2013 | Partovi | H02J 7/00 |
| 2013/0141580 | A1 | 6/2013 | Stein et al. | 348/148 |
| 2013/0147957 | A1 | 6/2013 | Stein | 348/148 |
| 2013/0179061 | A1 | 7/2013 | Gadh et al. | 701/123 |
| 2013/0199685 | A1 | 8/2013 | Nelson et al. | 152/415 |
| 2013/0228258 | A1 | 9/2013 | Knapke et al. | 152/415 |
| 2013/0282232 | A1 | 10/2013 | Medley et al. | 701/134.4 |
| 2014/0028016 | A1 | 1/2014 | Knapke | 285/98 |

(56) References Cited

U.S. PATENT DOCUMENTS

| | | | |
|---|---|---|---|
| 2014/0055090 A1 | 2/2014 | Krause | 320/108 |
| 2014/0069558 A1 | 3/2014 | Favia | 152/152.1 |
| 2014/0174870 A1* | 6/2014 | Niizuma | H02J 50/12 |
| | | | 191/10 |
| 2014/0372077 A1 | 12/2014 | Templ | 702/182 |
| 2015/0158354 A1 | 6/2015 | Lin et al. | B60C 25/00 |
| 2015/0246614 A1* | 9/2015 | Dames | B60L 5/005 |
| | | | 191/10 |
| 2015/0360577 A1* | 12/2015 | Greenwood | H02J 50/90 |
| | | | 320/108 |
| 2016/0023557 A1* | 1/2016 | Dimke | B60L 53/126 |
| | | | 320/108 |
| 2016/0031271 A1 | 2/2016 | Hibbler et al. | B60C 23/003 |
| 2016/0144727 A1* | 5/2016 | Tokura | B60L 53/126 |
| | | | 307/104 |
| 2016/0214442 A1 | 7/2016 | Nelson et al. | B60C 23/003 |
| 2016/0229228 A1 | 8/2016 | Gong et al. | B60C 5/24 |
| 2016/0236429 A1 | 8/2016 | Gong et al. | B29D 30/06 |
| 2016/0243949 A1* | 8/2016 | Merkel | H02J 50/90 |
| 2016/0288590 A1 | 10/2016 | Hennig et al. | B60C 23/003 |
| 2016/0318359 A1 | 11/2016 | Knapke et al. | B60C 23/10 |
| 2016/0339785 A1* | 11/2016 | Rumbak | B60L 53/12 |
| 2016/0347132 A1 | 12/2016 | Knapke et al. | B60C 23/003 |
| 2016/0347135 A1 | 12/2016 | Racine et al. | B60C 29/002 |
| 2016/0361957 A1 | 12/2016 | Burke et al. | B60C 23/003 |
| 2017/0080760 A1 | 3/2017 | Foor et al. | B60C 23/003 |
| 2017/0113498 A1 | 4/2017 | King et al. | B60C 23/003 |
| 2017/0136899 A1* | 5/2017 | Mashinsky | B60C 58/15 |
| 2017/0157988 A1 | 6/2017 | Takita | B60C 11/0306 |
| 2017/0210184 A1 | 7/2017 | Bonora et al. | B60C 23/003 |
| 2017/0217261 A1 | 8/2017 | Mays et al. | B60C 23/0479 |
| 2017/0278314 A1 | 9/2017 | Laskey et al. | G07C 5/008 |
| 2017/0299077 A1 | 10/2017 | Jabcon et al. | F16K 21/06 |
| 2017/0341567 A1 | 11/2017 | Englert | B60Q 1/326 |
| 2017/0341568 A1 | 11/2017 | Englert | B60Q 1/326 |
| 2017/0349009 A1 | 12/2017 | Ehrlich | B60C 23/0486 |
| 2017/0368896 A1 | 12/2017 | Balistreri et al. | B60C 29/002 |
| 2018/0022168 A1 | 1/2018 | Dunning et al. | B60C 23/003 |
| 2018/0056732 A1 | 3/2018 | Ingram et al. | B60C 23/003 |
| 2018/0056733 A1 | 3/2018 | Ingram et al. | B60C 23/003 |
| 2018/0065544 A1* | 3/2018 | Brusco | B60Q 1/543 |
| 2018/0072111 A1 | 3/2018 | Cappello et al. | B60C 23/003 |
| 2018/0072112 A1 | 3/2018 | Lee | B60C 23/003 |
| 2018/0104993 A1 | 4/2018 | Gillen | B60C 23/003 |
| 2018/0141393 A1 | 5/2018 | Gillen et al. | B60C 23/003 |
| 2018/0154713 A1 | 6/2018 | Burke et al. | B60C 29/02 |
| 2018/0208000 A1 | 7/2018 | Gilardino et al. | B60C 23/003 |
| 2018/0215201 A1 | 8/2018 | Balistreri | B60B 35/16 |
| 2018/0264963 A1 | 9/2018 | Dudar | B60L 11/1833 |
| 2018/0281510 A1 | 10/2018 | Bach et al. | B60B 7/06 |
| 2018/0290549 A1 | 10/2018 | Forsberg | B60L 11/1831 |
| 2018/0297423 A1 | 10/2018 | Furtado | B60C 23/003 |
| 2018/0304699 A1 | 10/2018 | Castriotta | B60C 23/003 |
| 2018/0304700 A1 | 10/2018 | Falls et al. | B60C 23/003 |
| 2018/0319227 A1 | 11/2018 | Abdel-Baset et al. | |
| | | | B60C 23/004 |
| 2019/0001762 A1 | 1/2019 | Blessing et al. | B60C 23/003 |
| 2019/0009622 A1 | 1/2019 | Buhrke | B60B 23/003 |
| 2019/0023091 A1 | 1/2019 | Spindler et al. | B60C 23/12 |
| 2019/0039423 A1 | 2/2019 | Mattavelli | B60C 23/003 |
| 2019/0039463 A1* | 2/2019 | Moghe | B60L 53/12 |
| 2019/0077189 A1 | 3/2019 | Kamiyama | B60B 21/025 |
| 2019/0077190 A1 | 3/2019 | Kamiyama et al. | B60B 21/12 |
| 2019/0097471 A1* | 3/2019 | Pantic | B60L 53/12 |
| 2019/0111731 A1 | 4/2019 | Kamiyama | B60B 21/02 |
| 2019/0111799 A1 | 4/2019 | Zethraeus et al. | B60L 11/1848 |
| 2019/0176548 A1 | 6/2019 | Richardson | B60C 23/10 |
| 2019/0187026 A1 | 6/2019 | Uhrich et al. | G01M 17/02 |
| 2019/0202298 A1 | 7/2019 | Shin et al. | B60L 9/00 |
| 2019/0257600 A1 | 8/2019 | Lyu et al. | F28F 27/00 |
| 2019/0315246 A1 | 10/2019 | Li et al. | B60L 53/66 |
| 2019/0359014 A1 | 11/2019 | Rethmel et al. | B60C 23/009 |
| 2019/0359210 A1 | 11/2019 | Sebestyen et al. | B60W 30/12 |
| 2019/0381840 A1 | 12/2019 | Hennig et al. | B60C 23/003 |
| 2019/0381902 A1 | 12/2019 | Apostolos et al. | B60L 53/12 |
| 2020/0009976 A1 | 1/2020 | Ohman et al. | B60L 53/35 |
| 2020/0028408 A1 | 1/2020 | Arnold | H02K 7/006 |
| 2020/0122601 A1* | 4/2020 | Nelson | B60L 50/53 |
| 2020/0130410 A1 | 4/2020 | Kamiyama et al. | B60B 21/12 |
| 2020/0130435 A1 | 4/2020 | Root et al. | B60C 23/12 |
| 2020/0169125 A1 | 5/2020 | Will, IV et al. | H02J 50/80 |
| 2020/0185997 A1 | 6/2020 | Hirasawa et al. | H02K 3/50 |
| 2020/0189325 A1 | 6/2020 | Pons et al. | B60C 11/1656 |
| 2020/0212721 A1* | 7/2020 | Narayana Bhat | B60L 53/122 |
| 2021/0001733 A1 | 1/2021 | Meins et al. | B60L 53/122 |
| 2021/0053445 A1 | 2/2021 | Forsberg | B60L 5/045 |
| 2021/0122340 A1 | 4/2021 | Bhimani et al. | B60T 8/1725 |
| 2021/0178841 A1 | 6/2021 | Garbelli | B60C 23/064 |
| 2021/0178916 A1 | 6/2021 | Partovi | B60L 53/122 |
| 2021/0188106 A1 | 6/2021 | Asa et al. | B60L 53/122 |
| 2021/0194356 A1 | 6/2021 | Afridi et al. | H02M 1/4233 |
| 2021/0242716 A1* | 8/2021 | Lee | H02J 50/10 |
| 2021/0276374 A1 | 9/2021 | Puppi et al. | B60C 24/041 |
| 2021/0289067 A1 | 9/2021 | Dellinger et al. | H04M 1/72409 |
| 2021/0291692 A1* | 9/2021 | Masoud | B60L 53/14 |
| 2021/0294391 A1 | 9/2021 | Silvanto et al. | G06F 1/1683 |
| 2021/0298187 A1 | 9/2021 | Merz et al. | H05K 5/0247 |
| 2021/0298197 A1 | 9/2021 | Nayak | H05K 7/2039 |
| 2021/0303081 A1 | 9/2021 | Kuboyama et al. | G06F 3/038 |
| 2021/0303089 A1 | 9/2021 | Ruscher et al. | H06F 3/03545 |
| 2021/0306812 A1 | 9/2021 | Gross et al. | H04W 4/029 |
| 2021/0309057 A1 | 10/2021 | Puppi et al. | B60C 23/041 |
| 2021/0310200 A1 | 10/2021 | Koudstaal et al. | E01C 11/227 |
| 2021/0311598 A1 | 10/2021 | Bernstein et al. | G06F 3/0482 |
| 2021/0314493 A1 | 10/2021 | Meyer et al. | H04N 5/23293 |
| 2021/0318798 A1 | 10/2021 | Manzari et al. | G06F 3/04847 |
| 2021/0319778 A1 | 10/2021 | Lerner et al. | G10K 11/17827 |
| 2021/0320281 A1 | 10/2021 | Shedletsky et al. | |
| | | | H01L 51/5284 |
| 2021/0325932 A1 | 10/2021 | Bushnell | G06F 1/1652 |
| 2021/0325942 A1 | 10/2021 | Bir et al. | G06F 1/1683 |
| 2021/0328626 A1 | 10/2021 | Daga et al. | H04B 5/0031 |
| 2021/0331593 A1 | 10/2021 | Zethraeus et al. | B60L 53/126 |
| 2021/0333801 A1 | 10/2021 | Schwie et al. | G05D 1/0278 |
| 2021/0336328 A1 | 10/2021 | Guffarth et al. | H01Q 1/3266 |
| 2021/0339584 A1 | 11/2021 | Puppi et al. | B60C 23/0493 |
| 2021/0359556 A1 | 11/2021 | Bossetti et al. | H02J 50/90 |
| 2022/0036020 A1 | 2/2022 | Kovarik et al. | G06K 7/1037 |
| 2022/0149666 A1 | 5/2022 | Sumiya et al. | H02J 50/50 |
| 2022/0412805 A1* | 12/2022 | Pointner | H04N 5/33 |

FOREIGN PATENT DOCUMENTS

| | | | |
|---|---|---|---|
| EP | 3 050 690 | 8/2016 | B29C 33/30 |
| EP | 3 050 717 | 8/2016 | B60C 5/24 |
| EP | 3 573 845 | 12/2019 | B60B 19/06 |
| EP | 3 640 062 | 4/2020 | B60C 23/00 |
| JP | H09-150612 | 6/1997 | B60C 73/02 |
| JP | 2009-168074 | 7/2009 | F16F 15/31 |
| JP | 2013-169904 | 9/2013 | B60K 7/00 |
| JP | 2013-193705 | 9/2013 | B60G 17/016 |
| KR | 10-1265831 | 5/2013 | B60B 21/02 |
| KR | 20210040500 A * | 4/2021 | |
| RU | 2 246 410 | 2/2005 | B60C 23/04 |
| WO | WO 2009/140586 | 11/2009 | B60C 23/00 |
| WO | WO 2015/042782 | 4/2015 | B60C 5/24 |
| WO | WO 2015/042788 | 4/2015 | B29C 33/30 |
| WO | WO 2017/116628 | 7/2017 | B60S 5/04 |
| WO | WO 2018/140248 | 8/2018 | B60B 19/06 |
| WO | WO 2020/120774 | 6/2020 | B60J 6/20 |

OTHER PUBLICATIONS

Afridi, Khurram "Energy Seminar", https://www.youtube.com/watch?v=fDXuyKMVzpY, Oct. 14, 2019, posted Nov. 1, 2019, 3 pgs.
Afridi, Khurram "Wireless Charging of Electric Vehicles" University of Colorado Boulder, Oct. 14, 2019, 6 pages
Bilodeau, "Introduction to PrimoveCity", www.bombardier.com, Dec. 2011, 33 pgs.
Bombardier, Primove Catenary-Free Operation, www.bombardier.com, 2008, 4 pgs.

(56) References Cited

OTHER PUBLICATIONS

Bosch, https://www.boschevsolutions.com/, accessed Jun. 3, 2022, 2 pgs.
Brusa, www.brusa.biz, accessed Jun. 7, 2022, 1 pg.
Cavnue, www.cavnue.com, accessed Jun. 6, 2022, 4 pgs.
Cobiella, Kelly, "The future of electric vehicle charging? Tech company tests roads for wireless charging", NBC Nightly News, https://www.nbcnews.com/nightly-news/video/the-future-of-electric-vehicle-charging-tech-company-tests-roads-for-wireless-charging-138360901706 , posted Apr. 22, 2022, 1 pg.
Conductix-Wampfler, https://www.conductix.us/en/content/conductix-wampfler-usa , accessed Jun. 3, 2022, 3 pgs.
Daihen, www.daihen.co.jp/en/d-broad/, accessed Jun. 3, 2022, 15 pgs.
Electreon, www.electreon.com, accessed Jun. 3, 2022 , 9 pgs.
Elonroad, www.elonroad.com, accessed Jun. 3, 2022, 5 pgs.
Hess, www.hess-ag.ch, accessed Jun. 6, 2022, 4 pgs.
Hevo, www.hevo.com, accessed Jun. 6, 2022, 2 pgs.
Kaist, www.kaist.ac.kr/kr/, accessed Jun. 6, 2022, 5 pgs.
Mojo Mobility, https://mojomobility.com/home, accessed Jun. 3, 2022, 2 pgs.
Momentum, www.momentumdynamics.com, accessed Jun. 3, 2022, 5 pgs.
Nutt, David "Research paves way for wireless charging of electrical vehicles" Cornell University, Apr. 28, 2021, https://news.cornell.edu/stories/2021/04/research-paves-way-wireless-charging-electric-vehicles, 5 pgs.
Panchal, et al. "Review of Static and Dynamic Wireless Electric Vehicle Charging System" Engineering Science and Technology, an International Journal 21 (2018) www.elsevier.com/locate/jestch Griffith School of Engineering, Griffith University, Nathan Campus, Brisbane 4111, Australia, 16 pages.
Panchal et al., "Static In-wheel Wireless Charging Systems for Electric Vehicles", International Journal of Scientific & Technology Research vol. 6, Issue 09, Sep. 2017, pp. 280-284.
Percebon, "Integration of Qualcomm Halo DEVC technology onto a Renault Kangoo—EMC & EMF assessment simulation report", www.qualcom.com, Apr. 25, 2017, 22 pgs.
PlasticRoad, www.plasticroad.com/en, accessed Jun. 6, 2022, 7 pgs.
Plugless Power, www.pluglesspower.com, accessed Jun. 6, 2022, 3 pgs.
Siemens, "Siemens invests in WiTricity to advance wireless charging for electric vehicles", Joint Press Release, www.new.siemans.com/global/en/products/energy, Jun. 9, 2022, 4 pgs.
Signature Systems, www.signature-systems.com, accessed Jun. 6, 2022, 5 pgs.
UC Berkeley, Institute of Transportation Studies, www.path.berkeley.edu, accessed Jun. 6, 2022, 6 pgs.
WiTricity, https://witricity.com/, accessed Jun. 3, 2022, 8 pgs.
ZF, "ZF Joins Forces with Goodyear to Offer Enhanced Tyre and Fleet Management Solutions for Commercial Vehicles Throughout Europe", Press Release, www.zf.com/mobile/en/technologies/domains , Jun. 8, 2021, 3 pgs.
International Search Report and Written Opinion issued in PCT/US22/29037, dated Jul. 25, 2022, 13 pgs.

\* cited by examiner

200

202 — at least a first wireless charging antenna is carried by a vehicle, the first wireless charging antenna in electrical communication with a vehicle propulsion system.

204 — A plurality of second wireless charging antennae is positioned on or within a modular roadway which is positioned over an aggregate road surface, the plurality of second wireless charging antennae being in communication with at least a roadway control system and a power source 206 — An authentication connection is established between the at least first wireless charging antenna and the roadway control system, wherein the authentication connection includes at least one identification marker of at least one of the first wireless charging antenna or the vehicle 208 — At least one of the first wireless charging antenna or one of the plurality of second wireless charging antennae triggers a dynamic seek operation between the first wireless charging antenna and the one of the plurality of second wireless charging antennae to pair the first wireless charging antenna with the one of the plurality of second wireless charging antennae 210 — A quantity of electrical energy is transferred between the first wireless charging antenna and the one of the plurality of second wireless charging antennae

FIG. 5

PRECISION CHARGING CONTROL OF AN UNTETHERED VEHICLE WITH A MODULAR VEHICLE CHARGING ROADWAY

CROSS REFERENCE TO RELATED APPLICATION

This application is a continuation-in-part of U.S. application Ser. No. 17/739,928 entitled, "Multiplex Vehicle Wheel Assembly Types", filed May 9, 2022, which claims priority to U.S. Provisional Application Ser. No. 63/187,523 entitled, "Multiplex Vehicle Wheel Assembly Type(s)" filed May 12, 2021, and this application claims priority to Application Ser. No. 63/187,523 entitled, "Multiplex Vehicle Wheel Assembly Type(s)" filed May 12, 2021, the entire disclosures of which are incorporated herein by reference.

FIELD OF THE DISCLOSURE

The present disclosure is generally related to vehicular assemblies and systems and more particularly is related to precision control charging of an untethered vehicle with a modular vehicle charging roadway.

BACKGROUND OF THE DISCLOSURE

Electrically-powered vehicles have been present in modern day transportation for decades. Busses, trams, subways, and similar multi-person transport vehicles often use electrical energy to power onboard propulsion systems. These types of transportation systems have a physical connection to an electric supply which is connected to a power source, such that electrical power from the source can be provided through the physical connection and to the vehicle's propulsion system, e.g., electric motors, magnetic levitation, or other types of electrically-powered propulsion systems. For instance, trams and subways may utilize a physical contact to overhead electrical lines positioned above the path of travel of the vehicle, where the physical contact is used to transfer power from a power source, often the grid, to the vehicle. Similarly, rail-based vehicles have been widely used where an electrified rail on which the vehicle travels, or in parallel to a vehicle path of travel, provides constant electrical energy to the vehicle. For instance, rail-based vehicles may include subterranean subway cars and monorails, among others.

In more recent times, electrically-powered automobiles have become commonplace. This emergence is due, in part, to efforts in commerce and society to provide more environmentally friendly means of transport which decrease the reliance on fossil fuels. This shift to using electrical power for the propulsion of automobiles, either in whole with fully electric vehicles, or in part with hybrid vehicles, has been partly enabled by the emergence of more efficient onboard batteries which allow the electric vehicle to have a range long enough for practical use. For instance, many electric vehicles can now travel a few hundred miles with their onboard batteries on a single charge.

Despite these improvements, these electric vehicles must still be charged using tethered connections, e.g., where a conductive wire or power cord is required to physically connect to the vehicle charging system, which are commonly only available in select locations, such as household garages, travel rest areas, and certain shopping venues. Additionally, these tethered connections require sufficient time for the vehicle's onboard batteries to be charged, which can be inconvenient and impractical to many drivers. For example, some electric vehicles charge at a rate of only between 2-44 range miles per hour of charge, which translates into these electric vehicles being impractical for longer trips or situations where the driver does not have time to wait for the vehicle to charge in between segments of a trip. As such, these shortcomings result in a large portion of automobile owners not considering or choosing electric vehicles for their individual transportation, despite their otherwise worthwhile benefits.

Thus, a heretofore unaddressed need exists in the industry to address the aforementioned deficiencies and inadequacies.

SUMMARY OF THE DISCLOSURE

In accordance with embodiments of the invention, a system and method for precision charging control of an untethered vehicle are provided where antennas in the vehicle and roadway are opportunistically connectable using an authentication connection and a dynamic seek operation which enable the vehicle charging antennae to pair with charging antennae in the roadway for charging. Additionally, in some embodiments, a modular roadway is provided where roadway antennae are mounted on or within a modular roadway which is positionable over existing aggregate roads.

Embodiments of the present disclosure provide a system and method for precision charging control of an untethered vehicle. In this regard, one embodiment of such a method, among others, can be broadly summarized by the following steps: providing at least a first wireless charging antenna carried by a vehicle, the first wireless charging antenna in electrical communication with a vehicle propulsion system; providing a plurality of second wireless charging antennae positioned on or within a roadway, the plurality of second wireless charging antennae being in communication with at least a roadway control system and a power source; establishing an authentication connection between the at least first wireless charging antenna and the roadway control system; triggering, by at least one of the first wireless charging antenna or one of the plurality of second wireless charging antennae, a dynamic seek operation between the first wireless charging antenna and the one of the plurality of second wireless charging antennae to pair the first wireless charging antenna with the one of the plurality of second wireless charging antennae; and transferring a quantity of electrical energy between the first wireless charging antenna and the one of the plurality of second wireless charging antennae.

The present disclosure can also be viewed as providing a system for precision charging control of an untethered vehicle. Briefly described, in architecture, one embodiment of the system, among others, can be implemented as follows. At least a first wireless charging antenna is carried by a vehicle, wherein the first wireless charging antenna is in electrical communication with a vehicle propulsion system. A plurality of second wireless charging antennae is positioned on or within a roadway, wherein the plurality of second wireless charging antennae is in communication with at least a roadway control system and a power source. An authentication connection is established between the at least first wireless charging antenna and the roadway control system. A dynamic seek operation is triggered by at least one of the first wireless charging antenna or one of the plurality of second wireless charging antennae between the first wireless charging antenna and the one of the plurality of second wireless charging antennae, wherein the dynamic seek operation pairs the first wireless charging antenna with the one of the plurality of second wireless charging antennae. A quantity of electrical energy is transferred between the first wireless charging antenna and the one of the plurality of second wireless charging antennae.

The present disclosure can also be viewed as providing methods of precision charging control of an untethered vehicle in motion on a modular roadway. In this regard, one embodiment of such a method, among others, can be broadly summarized by the following steps: providing at least a first wireless charging antenna carried by a vehicle, the first wireless charging antenna in electrical communication with a vehicle propulsion system; providing a plurality of second wireless charging antennae positioned on or within a modular roadway which is positioned over an aggregate road surface, the plurality of second wireless charging antennae being in communication with at least a roadway control system and a power source; establishing an authentication connection between the at least first wireless charging antenna and the roadway control system, wherein the authentication connection includes at least one identification marker of at least one of the first wireless charging antenna or the vehicle; triggering, by at least one of the first wireless charging antenna or one of the plurality of second wireless charging antennae, a dynamic seek operation between the first wireless charging antenna and the one of the plurality of second wireless charging antennae to pair the first wireless charging antenna with the one of the plurality of second wireless charging antennae; and transferring a quantity of electrical energy between the first wireless charging antenna and the one of the plurality of second wireless charging antennae.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 is a flowchart illustrating a method of precision charging control of an untethered vehicle in motion on a modular roadway, in accordance with exemplary embodiments of the present disclosure.

DETAILED DESCRIPTION

Figure 1:
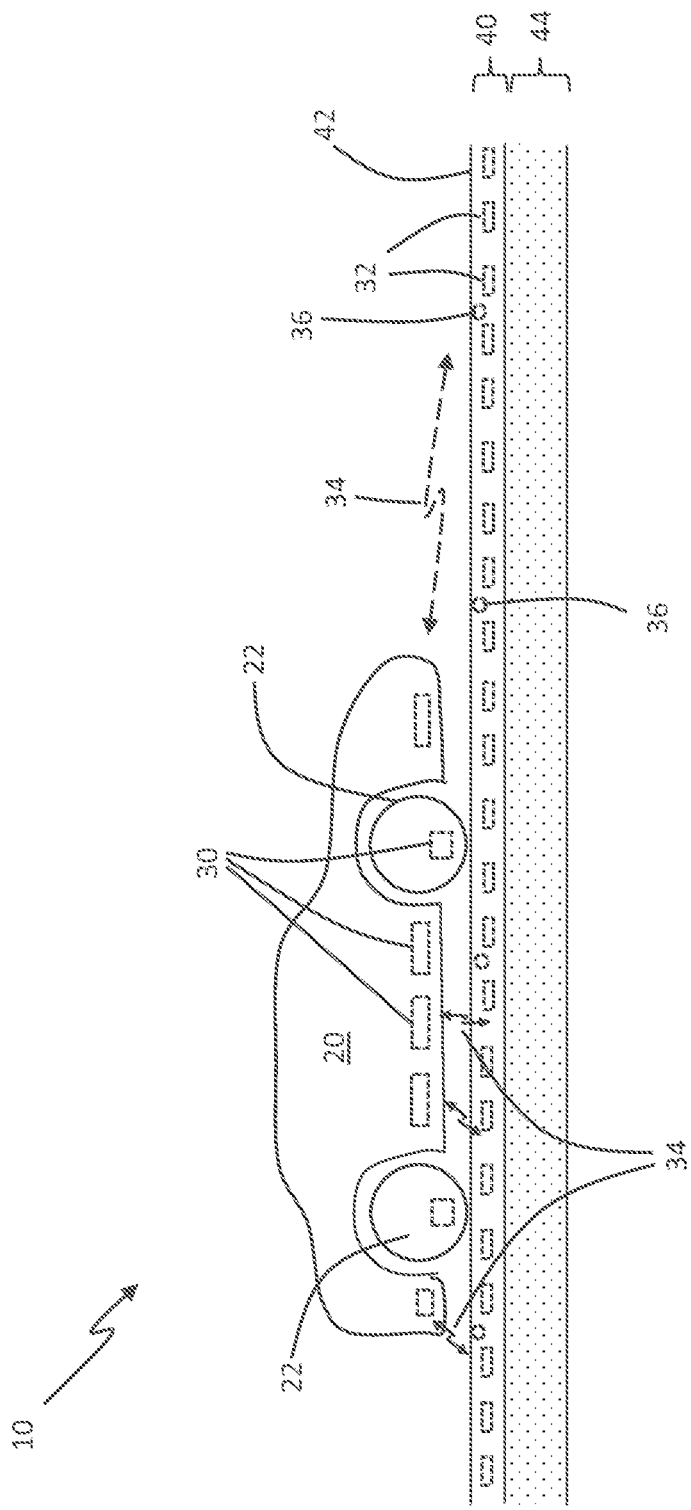
FIG. 1 is a diagrammatical illustration of a system for precision charging control of an untethered vehicle, in accordance with exemplary embodiments of the present disclosure.

While electric vehicles which rely on tethered charging systems have provided numerous improvements to electrically-powered transportation overall, they have shortcomings which cause them to be impractical in many situations, and this impracticality can lead to hesitancy or difficulties in adoption of the technology on a large scale. There have been various suggestions to improve these shortcomings, which have had only limited success. For instance, providing electrical vehicles with larger batteries or power storage capacity is often looked to as a solution, but the weight of additional onboard batteries can usually negate any improvement in range due to additional battery capacity. Another solution is using wireless charging systems which can be used in more locations, such that there is more of an ability to charge onboard batteries with ease. While this solution is less cumbersome than tethered charging connections, it still requires significant time for the onboard batteries to be charged to a level which makes them practical.

Yet another solution which has been proposed is to charge onboard batteries wirelessly while the vehicle is in motion, such as on a highway, or roadway, etc. This suggestion usually involves mounting inductive charging units within, or underneath the driving surfaces of existing asphalt roads, or use surfaces, such that when the vehicle drives over these charging units, the onboard batteries receive inductive power to charge them. There are numerous hurdles to overcome in order for such a system to be usable and practical. For one, these wireless charging units would have static activation, e.g., always activated irrespective of the presence of a vehicle over them or the type of vehicle, despite the different charging parameters. This is a 'one size fits all' approach which is inefficient and does not account for differences in electric vehicles, such as the different types, different power consumptions, or different power storage abilities, among others. Additionally, for such a system to be used, it must be retrofitted into existing roads, or use surfaces, which often involves substantial construction making it expensive and impractical. For instance, wireless charging units would require installation either by digging up existing roads, or use surfaces, or by incorporating the systems into construction practices of new roads or use surfaces.

Due to these issues, and others, such as ready access of embedded equipment, or components etc., for upgrading, or repairing, or replacing, or maintaining, or interchanging when necessary, or feasible, or useful, and/or other issues, there is a need for a solution to provide wireless electric charging of vehicles without the need for electric tethers or larger onboard batteries, and which does not have the barriers to entry that the current proposed wireless charging systems have. In accordance with embodiments of the invention, a system and method for precision charging control of an untethered vehicle are provided where antennas in the vehicle and roadway, or highway, or other use surfaces are opportunistically connectable using an authentication connection and a dynamic seek operation which enable the vehicle charging antennae to pair with charging antennae within, or embedded, or onto, or alongside the roadway or highway, or use surfaces for charging wirelessly. This results in a 'smart' charging system which can be dynamically used to provide wireless electrical power for different types of vehicles and vehicles having different charging parameters. Additionally, in some embodiments, a modular roadway is provided where roadway antennae are mounting on or within, or alongside a modular roadway which is positionable over existing aggregate roads or highways or use surfaces. This may allow easy installation, use, and adoption of the charging system since it substantially decreases the cost and effort of installation, or upgrading, or repairing, or replacing, or maintaining, or interchanging of embedded equipment, or components etc., as compared to proposed conventional wireless systems.

Figure 2:
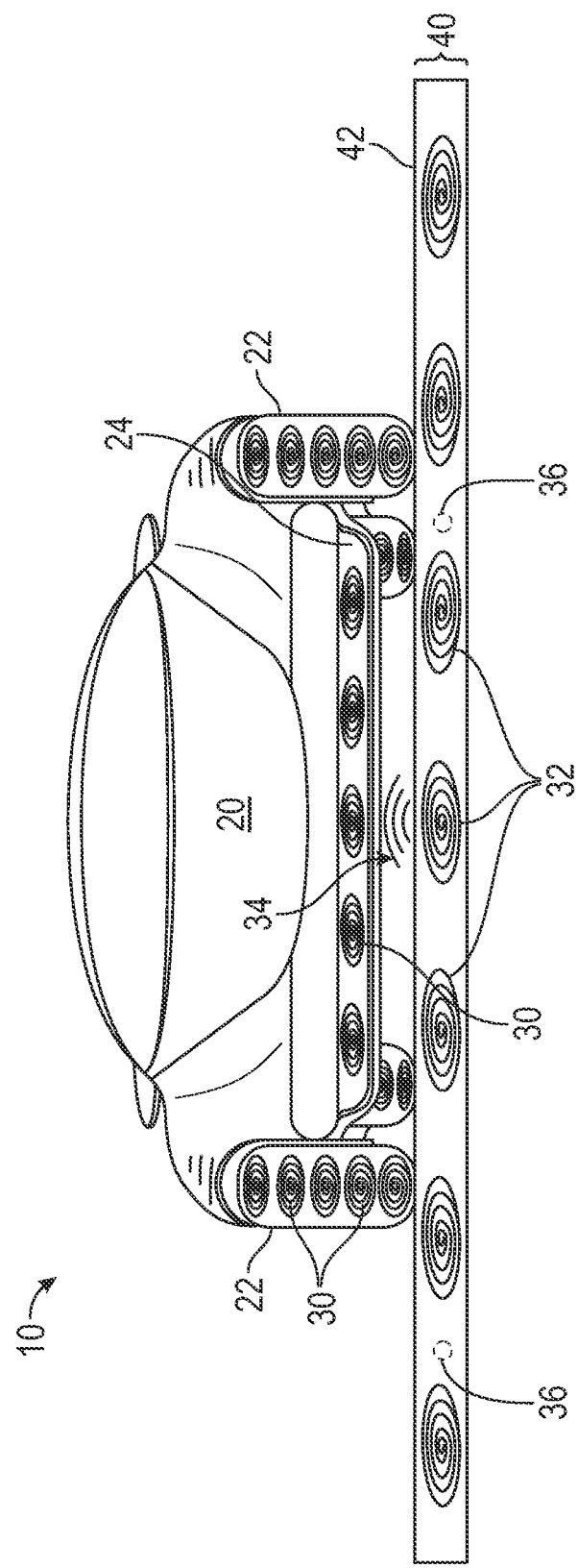
FIG. 2 is a diagrammatical illustration of the system for precision charging control of an untethered vehicle of FIG. 1, in accordance with exemplary embodiments of the present disclosure.

FIG. 1 is a diagrammatical illustration of a system for precision charging control of an untethered vehicle 10, in accordance with exemplary embodiments of the present disclosure. FIG. 2 is a diagrammatical illustration of the system for precision charging control of an untethered vehicle 10 of FIG. 1, in accordance with exemplary embodiments of the present disclosure. Relative to FIGS. 1-2, the system for precision charging control of an untethered vehicle 10, which may be referred to herein as 'system 10' includes a vehicle 20 which carries at least a first wireless charging antenna 30. The vehicle 20 may include any type of vehicular device which is capable of transporting objects between locations. Commonly, the vehicle 20 may include an automobile, such as a car, a truck, or a bus, among others, and may be a commercial vehicle, a private vehicle, a governmental vehicle, or any combination thereof. Additionally, the vehicle 20 may include other vehicular devices, such as golf carts, industrial or commercial machinery, such as forklifts, delivery equipment used within closed settings such as factories or warehouses, trams, shuttles, or other wheeled transportation devices.

The wireless charging antenna 30 may include one or more antennae which is mounted to or carried by the vehicle 20 in various ways. The vehicle 20 may be different sizes, features, or accommodations for receiving the wireless charging antenna 30, such that the antenna 30 can be positioned or located on various parts of the vehicle 20. For example, as shown in FIGS. 1-2, the vehicle 20 may carry a plurality of antennae 30, where a first portion of the antennae 30 are positioned along the bottom portion of the vehicle, such as positioned on or within the body of the vehicle 20 near the front and rear bumpers, or within the middle of the vehicle 20 between the tire and wheel assemblies 22, and a second portion of the antennae are positioned within the tire and wheel assemblies 22, or the antenna 30 may be positioned on another location of the vehicle 20. Instead of mounting the antennae 30 within a component or part of the vehicle 20, it may also be advantageous to house the antennae 30 within a housing compartment 24 or similar enclosure which itself is connected to or carried by the vehicle 20. FIG. 2 depicts the antennae 30 positioned within a housing compartment 24 which is carried along an undercarriage or chassis of the vehicle 20.

The vehicle 20 may operate on a roadway 40 which acts as a driving surface for the vehicle 20, whereby tires of the vehicle 20 contact a driving surface 42 of the roadway 40. The roadway 40 may be positioned over a conventional aggregate road surface 44, as shown in FIG. 1. The roadway 40, which is described in detail relative to FIGS. 6-8B includes a plurality of wireless charging antennae which are mounted therein, or proximate thereto, such that there is a relatively close proximity between the antennae 30 carried by the vehicle 20 and the antennae 32 of the roadway 40. This relatively close proximity allows the antennae 30, 32 to achieve a positioning which is close enough to allow for successful and efficient wireless charging signals 34 to be transmitted between the antennae 30 and antennae 32. It may be advantageous for the antennae 30 of the vehicle 20 to be positioned in a location on the vehicle 20 where they can be in close proximity to a surface 42 of the roadway 40 to better achieve the spaced distance between the antennae 30 and antennae 32 for charging. As such, the antennae 30 of the vehicle 20 may be positioned on a lower part of the vehicle 20, such as the portions of the vehicle 20 which are nearer the road surface 42 or even touching the road surface 42, such as the tire and wheel assemblies 22.

Each of the antennae 30, 32 may include any type of wireless electronic device which is capable of transmitting and/or receiving an electrical signal 34. For instance, the antennae 30, 32 may each be constructed from coiled conductive wire through which an electrical signal 34 can be transmitted, and where transmission of that electrical signal 34 causes a transfer of electrical energy between the antennae 30, 32. The antennae 30, 32 may operate using various known or unknown wireless charging techniques, such as through the use of tightly-coupled electromagnetic inductive or non-radiative devices, through the use of loosely-coupled or radiative electromagnetic resonant charging devices, or in certain situations, through the use of uncoupled radio frequency (RF) wireless charging units. Other wireless charging devices and techniques may also be used, as is known in the art, all of which are considered within the scope of the present disclosure. For instance, it may be possible for wireless power transfer (WPT) to utilize additional componentry which is housed within a protective case or compartment of the roadway 40 or the vehicle 20, such as a capacitive WPT system, where the components are positioned within the vehicle 20 or roadway 40. In one example, the antennae 32 may be Inductive or conductive wireless charging systems which are organized, integrated, formed, or otherwise wired together into a group or cluster of antennae 32 which may simultaneously reliably interact with one another. This may allow for adjustability with the antennae 32, such that connections to one or more of the antennae 32 can be achieved dynamically, in sequence, synchronized, or through another technique. It may also be desirable for magnetic inductive or conductive antennae to be adjustable (tunable), either manually, automatically, or semi-automatically, to achieve different frequencies levels, vibrations, or oscillations, as may be needed.

Figure 3:
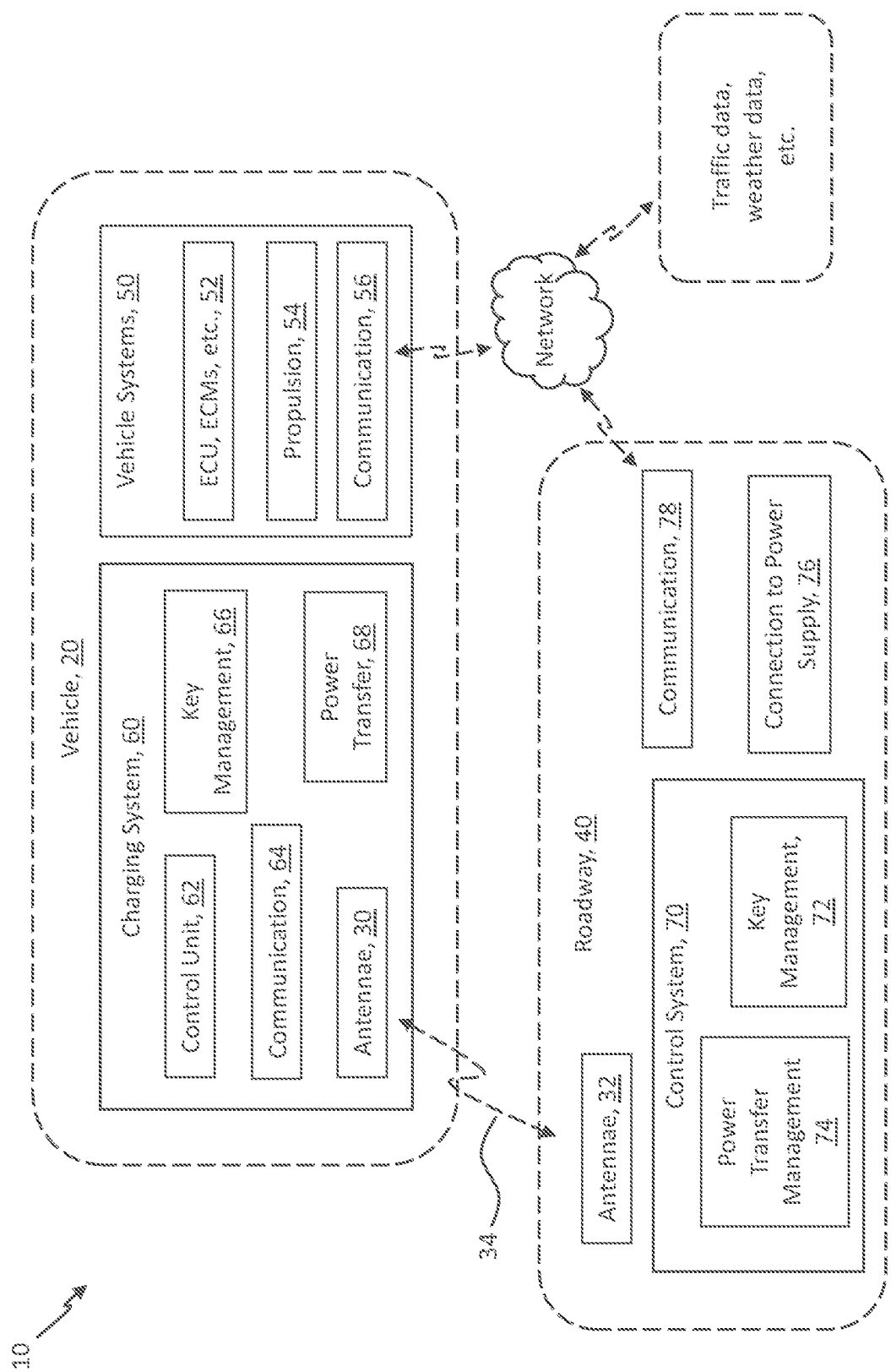
FIG. 3 is a block diagram illustration of a system for precision charging control of an untethered vehicle, in accordance with exemplary embodiments of the present disclosure.

FIG. 3 is a block diagram illustration of the system for precision charging control of an untethered vehicle 10, in accordance with exemplary embodiments of the present disclosure. In particular, FIG. 3 illustrates general architecture of the system 10 which may be used. The vehicle 20 may generally include a vehicle system module 50 which generally includes all standard components and functionality conventionally seen with vehicles 20. For instance, the vehicle system module 50 may include one or more control devices 52 for vehicle control and operation, which may include, for instance, an engine control unit (ECU), or one or more electronic control modules (ECM), or other computer or electronic control devices within the vehicle 20. The vehicle system module 50 may also include a propulsion system 54 which may include the vehicle's 20 drivetrain, powertrain, or similar components which enable the vehicle to move. A communication module 56 may also be included, which may control the vehicle's 20 communication, such as data input, GPS, navigation, or similar communication systems. While not depicted in FIG. 3, the vehicle system module 50 may also include any other standard automotive components or specialized controls or control systems, including virtual instrumentation, satellite systems, ground-based send/receive devices, or associated power infrastructure, or others.

The system 10 is implemented in the vehicle 20, at least in part, through a charging system module 60, which is one or more devices arranged in any configuration which enable the use of the system 10 for wireless charging of the vehicle 20. The charging system module 60 may include a control unit 62 which controls functionality of the components of the charging system module 60, a communication unit 64 which controls communication to and/or from the system 10, antennae 30, a key management system 66 which controls authorization and/or authentication connection or process of the system 10, and a power transfer unit 68 which controls the transfer of electrical energy to the vehicle 20. The specific functionality of these components of the charging system module 60 are discussed further, relative to this and other figures of this disclosure.

The roadway 40 includes one or more antennae 32, as previously discussed, where a quantity of electrical energy transferred between the antennae 30 and the one or more of the plurality of antennae 32 in the roadway 40. Commonly, vehicle charging operations, the electrical energy is transferred as a signal 34 from the antennae 32 to the antennae 30 in the vehicle 20, such that the electrical energy can be used to power a propulsion system 54 within the vehicle 20. However, in certain situations, there may be the ability for the antennae 30 of the vehicle 20 to transfer electrical energy from the antennae 30 to the antennae 32 in the roadway 40. For instance, this transfer direction of energy may be useful in situations where it is desirable for energy to be removed from a vehicle 20.

The roadway 40 further includes a control system 70 which includes one or more devices arranged in any configuration which control, direct, or otherwise assist with operation of the system 10 on the roadway 40 side. As shown in FIG. 3, the control system 70 includes various submodules which are directed to specific functionality within the system 10. One of the submodules is a key management module 72 which performs the functions of authorization and access to use the system 10 in conjunction with the key management system 66 on the vehicle 20 side. The control system 70 also includes a submodule directed to power transfer management 74, which controls, oversees, or assists, in whole or part, with the transfer of electrical energy between the roadway 40 and the vehicle 20. Additional submodules within the control system 70 include a connection to power supply module 76 which manages the power supply input to the roadway 40, such as from the grid or another power source, and a communication module 78 which manages communication functionality on the roadway 40 side of the system 10.

Further descriptions and examples of the systems and subsystems about the vehicle 20 and the roadway 40 can be understood through operation of the system 10. With reference to FIGS. 1-3 together, operation of the system 10 may allow for a vehicle 20 to receive an electric charge from roadway 40 while the vehicle 20 is in motion or when the vehicle 20 is stationary, using a dynamic seek operation which allows for opportunistic connections between the antennae 30 in the vehicle 20 and the antennae 32 in the roadway 40. Prior to receiving an electric charge from the roadway 40, an authentication connection may be established between the antennae 30 in the vehicle 20 and the roadway control system 70, where the authentication connection effectively establishes a match between the antennae 30 and the roadway 40 portion of the system 10. This match may allow, control, or aid in the vehicle 20 having authorization for use of the system 10 during any portion of use of the system 10, such as, for example, in an initial use where the vehicle 20 enters a roadway 40, while the vehicle 20 is operating on the roadway 40 and during an exit of the vehicle 20 from the roadway. The authentication connection, or an authentication process to establish authentication, may be a pre-trigger or trigger for the system 10 which establishes at least an initial communication connection between the vehicle 20 and the roadway 40 side of the system 10, which can allow the vehicle 20 to initiate and/or take electrical energy from the roadway 40 antennae 32, to carry through the process of receiving electrical energy, and to end the process of receiving electrical energy.

The authentication connection between the antennae 30 and the roadway control system 70 may include the use of one or more identification protocols. For example, the authentication connection may include an identification (ID) matching component whereby the vehicle 20 and/or each of the antennae 30 carried by the vehicle 20 can be identified with an ID key or signature, which may be digital and embedded or otherwise, such as one or more numeric, alpha-numeric, or textual codes, or another identification technique. This allows the system 10 to recognize the specific vehicle 20 or the antennae 30 carried by the vehicle 20 with precision, such that it can be known when the vehicle 20 or the antennae 30 on the vehicle 20 is authorized to connect to the system 10. The authentication connection may communicate the ID key or signature of the vehicle 20 or antennae 30 to the roadway control system 70 which may process the authentication of the vehicle 20 or the antennae 30. For instance, when a vehicle 20 first approaches the roadway 40, an authentication signal may be transmitted from one or more of the antennae 30 on the vehicle 20, or from another component of the vehicle 20, to the roadway control system 70 where permission to connect to the roadway system is requested. Upon receiving this request, the roadway control system 70 may determine whether the vehicle 20 or antennae 30 is authorized. If authorized, the roadway control system 70 may allow one or more antennae 30 on the vehicle 20 to connect to the antennae 32 of the roadway 40, whereas if authorization is not determined, the vehicle 20 may be denied authorization. Accordingly, after authorization is established, when the vehicle 20 enters the roadway 40, the antennae 30 of the vehicle 20 may connect to the antennae 32 in the roadway 40 and begin a charging process.

The process of transmitting electrical energy to the vehicle 20 may include variations and different processes, depending on the design and the intended use of the system 10. In one example, the charging process uses a dynamic seek operation which allows for opportunistic pairing between the antennae 30, 32 thereby allowing for 'smart' connections between the antennae 30, 32. As an example, the dynamic seek operation may utilize one or more of antennae availability, antennae location, a speed of the vehicle 20, an antenna magnetic flux, or one or more other parameters, to determine which pairing of the antennae 30 on, and/or within the vehicle 20 to the antennae 32 on, and/or within the roadway 40, and/or the antenna 32 on, and/or within the roadway 40 to the antennae 30 on, and/or within the vehicle 20 (simultaneously and reliably) is best for a wireless charging process. Additionally, opportunistic connections help ensure that even when there isn't a perfect or ideal pairing of antennae 30, 32, the desired parameter of charging is achieved. For instance, some antennae 30, 32 pairs may receive 100% electrical transfer of energy, whereas others may receive less. In comparison, conventional wireless charging often is binary, where the charge is either present in full or not present at all, but not able to charge to the degree available in a given situation.

It is noted that this dynamic seek operation may be initiated on either the vehicle 20 side or the roadway 40 side, whereby either or both of the antennae 30 of the vehicle 20 or the antennae 32 of the roadway 40 may initiate a seek function to seek out one or more antennae on the opposing side of the system 10.

The dynamic seek operation may commonly utilize one or more sensors 36 or sensing devices to identify data about the vehicle 20 or roadway 40 to help determine the appropriating pairing between the antennae 30, 32. For instance, it is possible for the roadway 40 to have sensors 36 which determine the pressure applied to the surface of the roadway 40, i.e., pressure or tactile sensors, which are positioned near a surface of the roadway 40 and which can be used to determine when a weighted object is located in a particular location on the roadway 40. When a vehicle 20 is traveling down the roadway 40, the pressure sensors can determine the presence of the vehicle 20 based on its weight which can be used by the system 10 to determine a relative location between the antennae 30 on the vehicle 20 and the antennae 32 in the roadway 40. This determination can also utilize information from the authentication process. For example, in a simplistic scenario, when a vehicle 20 is authenticated, the system 10 may determine that the vehicle 20 has 16 antennae 30, with four antennae 30 in each of the vehicle's 20 four tires. As the vehicle 20 is moving on the roadway 40, the sensors 36 may determine the vehicle's 20 positioning based on the pressure sensed at the locations of the vehicle's 20 tires. The dynamic seek operation may utilize this information to determine that an ideal pairing for electric charge between the vehicle 20 and the roadway 40 is to activate the transfer of electrical energy from the antennas 32 in the roadway which are within a certain distance of the sensed pressure of the vehicle's 20 tires, such as within 1 foot, 3 feet, or some other distance. Thus, in this example, as the vehicle 20 moves along the roadway 40, only the antenna 32 which are determined to be within a specific distance of the vehicle 20 tires will be activated to pair with the antennae 30 in the vehicle's 20 tires and transfer electrical energy to the antennae 30 carried by the vehicle 20.

In another example, the system 10 may utilize sensors 36 in communication with the antennae 32 which can sense objects based on wireless signals, such as optical signals, acoustic signals, magnetic signals, or other types of wireless signals. For instance, the vehicle 20 may include optical devices which emanate or output an optical signal in front of the vehicle 20. As the vehicle 20 moves along the roadway 40, the sensors 36 may be able to identify the optical signal emanated from the vehicle 20, which can be used to determine a position of the vehicle 20, such as, for example, using a known locating technique, such as triangulation or similar techniques. When the signal is received at the sensor 36, it may be communicated to the control system 70, where the power transfer management 74 unit can determine which antennae 32 to activate and at what point in time. With this information, along with the authentication information about the antennae 30 on the vehicle 20, the control system 70 can selectively activate antennae 32 on the roadway 40 which correspond to the determined locations of the vehicle 20 antennae 30, thus providing an electric charge to and/or from the antennae 30 on the vehicle 20 as may be necessary, or feasible, or useful. It may be advantageous for optical signals to be communicated utilizing optical switching with fiber optics, such as with fiber optics mounted in the roadway 40, and within the vehicle, thereby allowing fast switching and data transfer of the optical signals, and/or through the use of other fast switching and data transfer devices, or technologies as may be necessary, or feasible, or useful.

In a similar example, the system 10 may utilize an acoustic transducer or similar device which is mounted on or within the vehicle 20 and which is capable of emitting an acoustic signal from the vehicle 20. The sensors 36, or a portion thereof, may be acoustic sensors which are capable of receiving the acoustic signals and using a technique, such as time-of-flight measurements or a pulse-echo technique to determine a precise or approximate location of the vehicle 20 on the roadway 40. When the signal is received at the sensor 36, it may be communicated to the control system 70, where it may be processed to determine the location of the vehicle 20, and the power transfer management 74 unit can determine which antennae 32 to activate and at what point in time, at a point in time to correspond to a location of the vehicle 20. With this information, along with the authentication information about the antennae 30 on the vehicle 20, the control system 70 can selectively activate antennae 32 on the roadway 40 which correspond to the determined locations of the vehicle 20 antennae 30, thus providing an electric charge to the antennae 30 on the vehicle 20.

In yet another example, a similar principle may be employed using a magnetic signal communicated between the antennae 30 in the vehicle 20 and the antennae 32 within the roadway 40. For instance, a sensor on the vehicle 20 or the roadway 40, or one of the antennae 30, 32, or both, may emanate a magnetic signal which is communicated between the vehicle side and the roadway side to precisely, or approximately, determine the location of the vehicle 20 on the roadway 40. When the signal is received at a sensor or at one of the antennae 30, 32, or at another component of the system 10, the signal may be processed to determine the location of the vehicle 20. Then the power transfer management 74 unit can determine which antennae 32 to activate and at what point in time, at a point in time to correspond to a location of the vehicle 20. With this information, along with the authentication information about the antennae 30 on the vehicle 20, the control system 70 can selectively activate antennae 32 on the roadway 40 which correspond to the determined locations of the vehicle 20 antennae 30, thus providing an electric charge to the antennae 30 on the vehicle 20. It is noted that the power transfer management unit 74 may be able to control power transfer using any known technique, such as with a range of adjustable power settings, e.g., low, medium, high (DC fast charging) for associated electricity I/O device(s), or technologies, or equipment.

It is noted that the system 10 can operate in an action-response mode, whereby the electric charge is transmitted from the antennae 32 of the roadway 40 in response to a sensed signal which corresponds to an action or interaction between the vehicle 20 and the roadway 40. For instance, in response to an optical, acoustic, or magnetic signal, or in response to a sensed pressure, any of which are an 'action', the system 10 may initiate the response of activating one or more antennae 32 in the roadway 40 to transmit electrical energy to the vehicle 20. In one of many alternative embodiments, the system 10 may also operate in a prediction mode, whereby one or more of the components of the system 10, such as the control unit 62 of the vehicle 20 or the control system 70 of the roadway 40 may employ predictive data analysis to predict, in whole or part, which of the antennae 30, 32 to activate and at which point in time. For instance, the system 10 may utilize computerized algorithms with artificial intelligence (AI), machine learning (ML), neural networks, or similar predictive analysis, which is capable of identifying which of the antennae 30, 32 should be activated. Often, this predictive analysis may utilize historical data from the vehicle 20, the roadway 40, or another parameter.

For instance, in a simplistic example, the system 10 may utilize predictive analysis to predict the location of the vehicle 20 on the roadway 40 while it is moving on the roadway 40 based on immediate past interactions. As the vehicle 20 is in motion and the antennae 30, 32 connect at a first location on the roadway 40, the predictive analysis may utilize the time of this connection with a speed of the vehicle 20 to predict a future immediate position of the vehicle 20, such that the antennae 32 on the roadway 40 at that future immediate position can be activated at a time which corresponds to the predicted time the vehicle 20 will be at that location. For instance, if a vehicle is moving at 65 miles per hour (MPH) on the roadway 40 and the vehicle 20 passes a first antenna 32 on the roadway, it can be predicted that the vehicle 20 will pass by a second antennae 32, in line with the first antennae 32 and positioned 9.5 feet from the first antenna 32, in approximately 0.1 seconds. This same prediction can be used to predict future positions of the vehicle 20 and, thus, predict which downstream antennae 32 to activate and at what approximate time.

The use of historical data can also be employed in less linear situations, such as, for situations where other characteristics of the roadway 40, the vehicle 20, traffic, weather, or other aspects can be used to aid in predicting where the vehicle 20 may be on the roadway 40. In one example, the presence of a traffic light or stop sign on the roadway 40 can be used to predict that the vehicle 20 will slow down or stop at a certain location on the roadway 40, i.e., at a location just before the traffic light or stop sign. With this prediction, it is possible to activate antennae 32 in the roadway 40 accordingly. For instance, with a stop sign in the roadway 40, it will be possible to predict that the vehicle 20 will have a stop in motion, at least momentarily, such that antennae 32 at the location of the vehicle 20 stop can be activated to provide an electrical charge to the vehicle 20 at that location. Similarly, with a traffic light, a dynamic prediction can be made using the same technique as a stop sign, but also by incorporating the status of the traffic light, e.g., whether it is red, yellow, or green, which can be communicated to the system 10 through the communication module 78, for example. For instance, if the vehicle 20 approaches a traffic light which is green, it may be predicted that the vehicle 20 will not stop or will not slow down, whereas if the traffic light is red or yellow, it can be predicted that the vehicle 20 may slow down or stop, such that the antennae 32 at that location before the traffic light can be activated accordingly.

Another construct of dynamic prediction can be made using messaging (information) about upcoming traffic signs, or lights, or physical road configurations such as approaching corners, forks, bends, lanes, intersections, entry/exit ramps (types) etc., or other pertinent information e.g., accidents, or slowed traffic etc., that may be communicated to a vehicle 20 by way of electronic, or digital systems, or other means or ways while traversing the "smart" roadway 40, providing imminent, or near future, or future, or pending actions/reactions such that a vehicle 20 and/or roadway 40 can activate antennae 30, 32 and/or systems accordingly.

It is noted that in some situations, the dynamic seek operation may be incapacitated, automatically or manually deactivated, or otherwise unavailable. For instance, this could occur there's an overheating of an antenna 30, 32 or some other problem, where the system 10 needed to shut down temporarily. In these situations, the system 10 may be capable of charging the vehicle 20 using known or conventional techniques, e.g., where the connection between the antennae 30, 32 is not controlled opportunistically, but is made based simply on the presence of one antenna 30 being in a close proximity to the other antennae 32. With regards to overheating of the antenna 30, 32 or other components, it is noted that these components can utilize integratable heatsink devices to transfer heat from the component such that it can dissipate. Not only can these heatsink(s) aid in thermal transfer from operation of the antenna 30, 32 they may also help with thermal dissipation due to environmental conditions, such as sunlight, high temperature conditions, etc.

The system 10 may receive an input within the communication module 78, such as through one or more network locations, of local traffic data, weather data, or similar information, which can be used to predict possible driving situations in the vehicle 20 at a location on the roadway 40, which can then be used to activate antennae 32 in that location. For instance, if there is heavy congestion of traffic in a certain part of the roadway 40, the antennae 32 in that location can be activated to correspond with slower-moving vehicles 20. In a similar fashion, inclement weather can be communicated to the system 10, which can be used to make predictions of vehicle 20 positioning or movement, which can be used to control antennae 32.

While the system 10 normally transmits electrical energy from the antennae 32 of the roadway 40 to the antennae 30 of the vehicle, it is also possible for the system 10 to transfer electrical energy from the vehicle 20 to the roadway 40. For instance, the system 10 may include an emergency backup or fail-safe mode whereby a vehicle 20 can transmit energy captured on board, such as from regenerative breaking, in wheel generators, or other techniques, to the roadway 40. In some situations, this transmission of electrical energy to the roadway 40 may occur when there is excess electricity in the vehicle 20. Such excess electricity can be automatically measured by the vehicle's battery management system and automatically transferred back to the power source to which the roadway 40 is connected.

It may be desirable to use a battery management system to integrate a battery connection to load circuit, such as a pre-charge system allowing a safe way to connect the battery system to different loads and eliminating the excessive inrush currents to load capacitors. For example, the connection to loads may be normally controlled through electromagnetic relays "contactors." The percentage circuit may be the power resistors connected in series with the loads, until the capacitors are charged. In one of many alternatives, a switched mode power supply connected in parallel to loads may be used to charge the voltage of the load circuit up to a level close enough to battery voltage in order to allow closing the "contactors" between battery system and load circuit.

It may also be possible for the battery management system to integrate a balancing technique in order to maximize the associated battery system capacity, and for the prevention of localized under/overcharging. In one example, the battery management system may actively ensure that all the associated battery cells of the battery system are kept, or maintained at the same voltage, or state of charge through such balancing. The battery management system may balance the associated cell(s) by wasting energy from the most charged cell(s) by connecting them to a load, e.g., with the use of a passive regulator, and by shuffling energy from the most charged cell(s) to the least charged cell(s), and by automatically or manually reducing the current charge to a sufficiently low level that will not damage fully charged cell(s), while less charged cell(s) continue to charge.

It should be noted that the system 10 may also operate in a mode which utilizes action-response modes and predictive modes together, such as where certain parts of the roadway 40 provide electrical energy transmission with action-response mode while other parts of the roadway 40 utilize predictive modes. As an example, a straight portion of the roadway 40 can utilize action-response modes which activate antennae 32 based on the sensed location of the vehicle 20, whereas more complex portions of the roadway 40, such as at intersections, curves, or other non-linear sections, can utilize predictive analysis. The combination of both modes may allow the system 10 to employ more simplistic processing for certain parts of the roadway 40, thereby using processor-light processing techniques, whereas processor-heavy processing can be utilized for more complex portions of the roadway 40 or vehicular traffic.

The operation of the system 10 may include numerous variations which are based on various parameters of the use or intended use of the system 10. For instance, when vehicles 20 are authenticated by the system 10, it may be desirable to correlate the authentication with characteristics of the vehicle 20, such as the vehicle 20 type, which can then be used to control, adjust, or otherwise modify the electrical energy transferred to that vehicle 20. In one example, differently sized vehicles 20 may utilize different energy transfer protocols, such as where a small passenger car of electric transfer than other vehicles 20. Accordingly, a size or a duration, or another aspect of the quantity of electrical energy which is between the antenna 30 and one or more of the antennae 32 may be dependent on a type of vehicle 20, which may be identified to the system 10 during authentication of the vehicle 20, or at another point of the system 10. However, it is noted that it is also possible for energy transfer to occur irrespective of vehicle size, whereby energy transfer is consistent to each antenna 30 on a vehicle, and larger vehicles carry more antennae 30 than smaller vehicles 20.

In yet another example, the authentication process of a vehicle 20 can be used to provide dynamic vehicle data, which may include data about the vehicle 20 which changes or is likely to change during operation of the vehicle 20. For instance, the dynamic vehicle data may include such data as a status of operation of the vehicle 20, e.g., on/off, warnings or codes from on-board diagnostics (OBD), etc., or it can include data about a current charge level of batteries of the vehicle 20, data sensed from the vehicle 20 itself, such as weather conditions, sunlight conditions, other vehicles in a proximity to the vehicle 20, traffic conditions, or other information. The roadway 40 may also carry a diagnostics system (OBD) conducting similar data points operations or other operations.

The authentication process of the vehicle 20 may also utilize a timestamping technique which allows for vehicle 20 data or system 10 data to be associated with a point in time, or a relative point in time. For example, the authentication connection may initially utilize a timestamping technique to identify when the vehicle 20 connects to the roadway side of the system 10, and/or when the vehicle 20 begins driving on the roadway 40. Timestamping may then be used for all or a portion of future events which the vehicle 20 has, such as connections between antennae 30, 32, or other events, whereby the timestamping can provide simultaneous or near-simultaneous interactions or communication between the antenna 30, 32. Timestamping may help collect data of all activities which occur in the system 10, which effectively provides a history of all events or activities which occur.

The system 10 may also correlate data with on-board global positioning system (GPS) data which is retrieved from the vehicle 20. This GPS data can be used to control, in whole or part, the dynamic seek operation utilized to pair the antenna 30, 32 and transfer electrical energy between the antennae 30, 32. For instance, GPS data can identify a near-precise location of the vehicle 20 on the roadway 40, whereby antennae 32 in that location can be activated at a time which corresponds to the vehicle 20 location. GPS data from the vehicle 20 can also be used with the predictive analysis of the system 10, in whole or part, to make predictions about vehicle 20 positioning or location.

Further, the system 10 can be adaptive, e.g., adaptively controlled, based on a location of the roadway 40 or vehicle 20 relative to other infrastructure, people, agriculture, or other settings. For example, the vehicle 20 may be driving on the roadway 40 in a heavily populated downtown environment with people in close proximity to the roadway 40. In this situation, the roadway 40 and/or the vehicle 20 may initiate or trigger a signal, which will only allow electrical power transfer through certain antennae 30, 32 of the vehicle 20 or roadway 40, for instance, such as to control the transfer of the quantity of electrical energy between one of the plurality of second wireless charging antennae in the roadway and the first portion or second portion of the plurality of first wireless antennae on the vehicle based on a proximity of the vehicle relative to people or agriculture. Thus, due to the proximity of humans or agriculture in a close and highly populated area, the dynamic seek operation may prioritize pairings between antennae 30 positioned within a tire and wheel assembly 22 of the vehicle 20 versus those antennae 30 which may be positioned on other parts of the vehicle 20 (further away from the roadway 40). In other words, when the vehicle is positioned proximate to people or agriculture, the quantity of electrical energy is switched to be transferred to the first portion of the plurality of first wireless antennae positioned within the one or more tire and wheel assemblies of the vehicle. This may be used to help mitigate any electromagnetic flux spill-over, i.e. electricity flux exposure as a result of larger air-gaps between send/receive antennae 30, 32, which may unintentionally radiate a human population that is in close proximity to the roadway 40 or vehicle 20 during the energy transfer. Conversely, when such an electricity transfer process is occurring on an interstate highway with no individuals in proximity, or on another open road, it may be possible to use all the antennae 30 on the vehicle 20 to maximize the electricity transfer process as necessary, or feasible, or useful. The system 10 may operate in accordance with safety standards, such as IEEE C.95.1 2005, ICNIRP 1998 (0 Hz-300 GHz) and ICNIRP 2010 (0 Hz-100 kHz), which describe adopted guidelines for human exposure to electromagnetic flux, or other applicable standards, or standardizing bodies.

Figure 4:
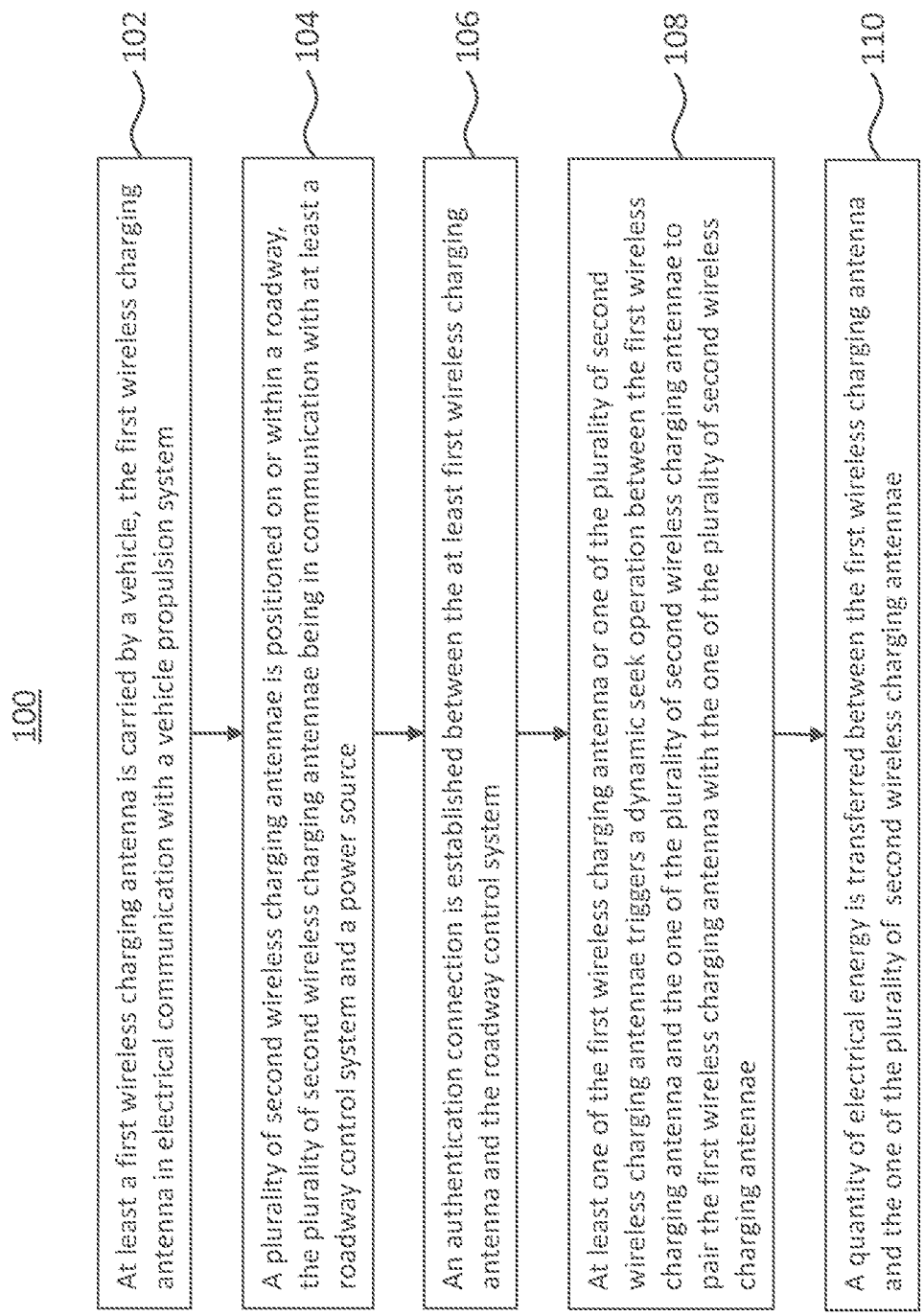
FIG. 4 is a flowchart illustrating a method of for precision charging control of an untethered vehicle, in accordance with exemplary embodiments of the present disclosure.

FIG. 4 is a flowchart 100 illustrating a method of precision charging control of an untethered vehicle, in accordance with exemplary embodiments of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, at least a first wireless charging antenna is carried by a vehicle, the first wireless charging antenna in electrical communication with a vehicle propulsion system. A plurality of second wireless charging antennae is positioned on or within a roadway, the plurality of second wireless charging antennae being in communication with at least a roadway control system and a power source (block 104). An authentication connection is established between the at least first wireless charging antenna and the roadway control system (block 106). At least one of the first wireless charging antenna or one of the plurality of second wireless charging antennae triggers a dynamic seek operation between the first wireless charging antenna and the one of the plurality of second wireless charging antennae to pair the first wireless charging antenna with the one of the plurality of second wireless charging antennae (block 108). A quantity of electrical energy is transferred between the first wireless charging antenna and the one of the plurality of second wireless charging antennae (110). Any number of additional steps, functions, processes, or variants thereof may be included in the method, including any disclosed relative to any other figure of this disclosure.

FIG. 5 is a flowchart illustrating a method of precision charging control of an untethered vehicle in motion on a modular roadway, in accordance with exemplary embodiments of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 202, at least a first wireless charging antenna is carried by a vehicle, the first wireless charging antenna in electrical communication with a vehicle propulsion system. A plurality of second wireless charging antennae is positioned on or within a modular roadway which is positioned over an aggregate road surface, the plurality of second wireless charging antennae being in communication with at least a roadway control system and a power source (block 204). An authentication connection is established between the at least first wireless charging antenna and the roadway control system, wherein the authentication connection includes at least one identification marker of at least one of the first wireless charging antenna or the vehicle (block 206). At least one of the first wireless charging antenna or one of the plurality of second wireless charging antennae triggers a dynamic seek operation between the first wireless charging antenna and the one of the plurality of second wireless charging antennae to pair the first wireless charging antenna with the one of the plurality of second wireless charging antennae (block 208). A quantity of electrical energy is transferred between the first wireless charging antenna and the one of the plurality of second wireless charging antennae (block 210). Any number of additional steps, functions, processes, or variants thereof may be included in the method, including any disclosed relative to any other figure of this disclosure.

Figure 6:
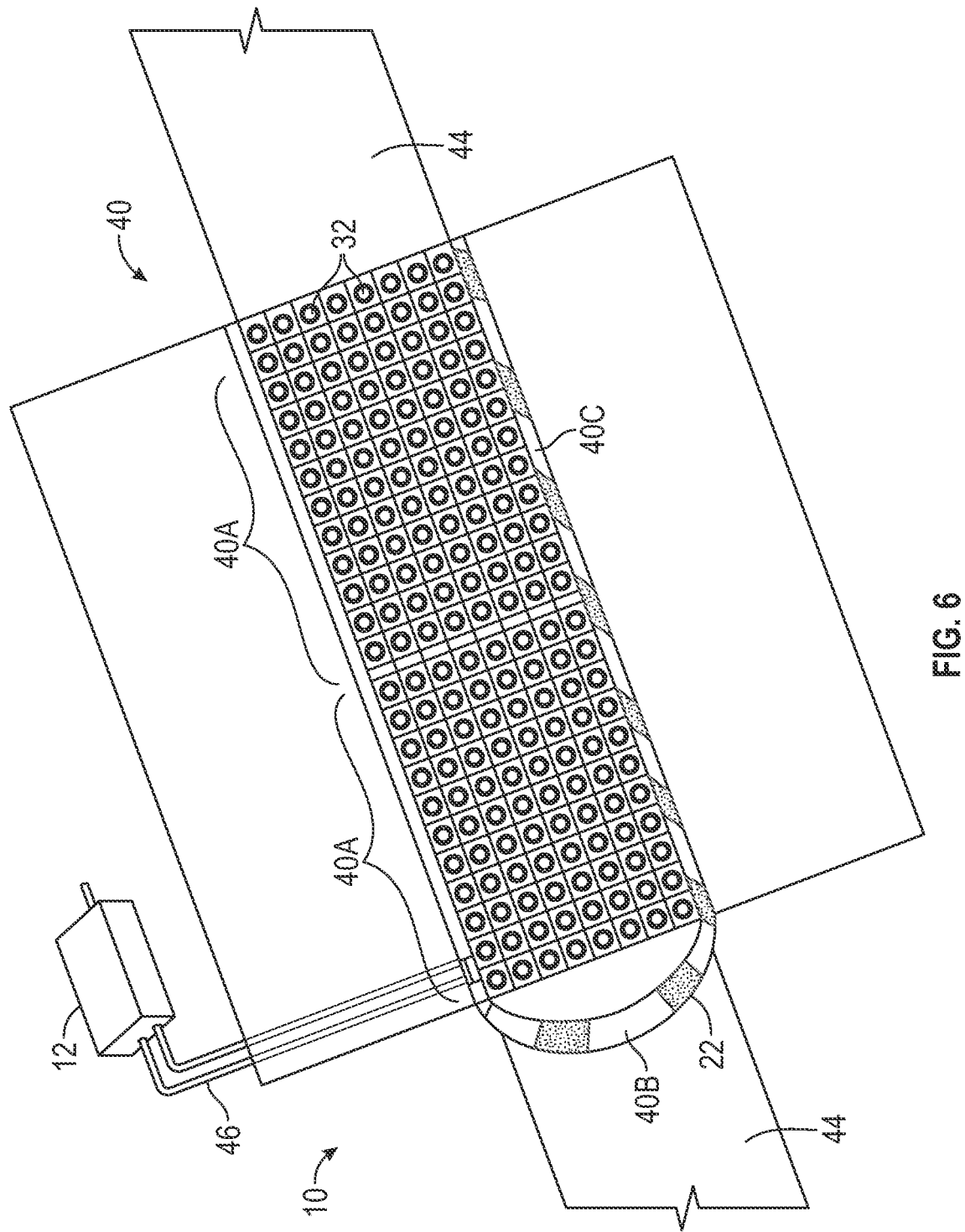
FIG. 6 is a diagrammatical illustration of a roadway used within a system for precision charging control of an untethered vehicle, in accordance with exemplary embodiments of the present disclosure.
Figure 7:
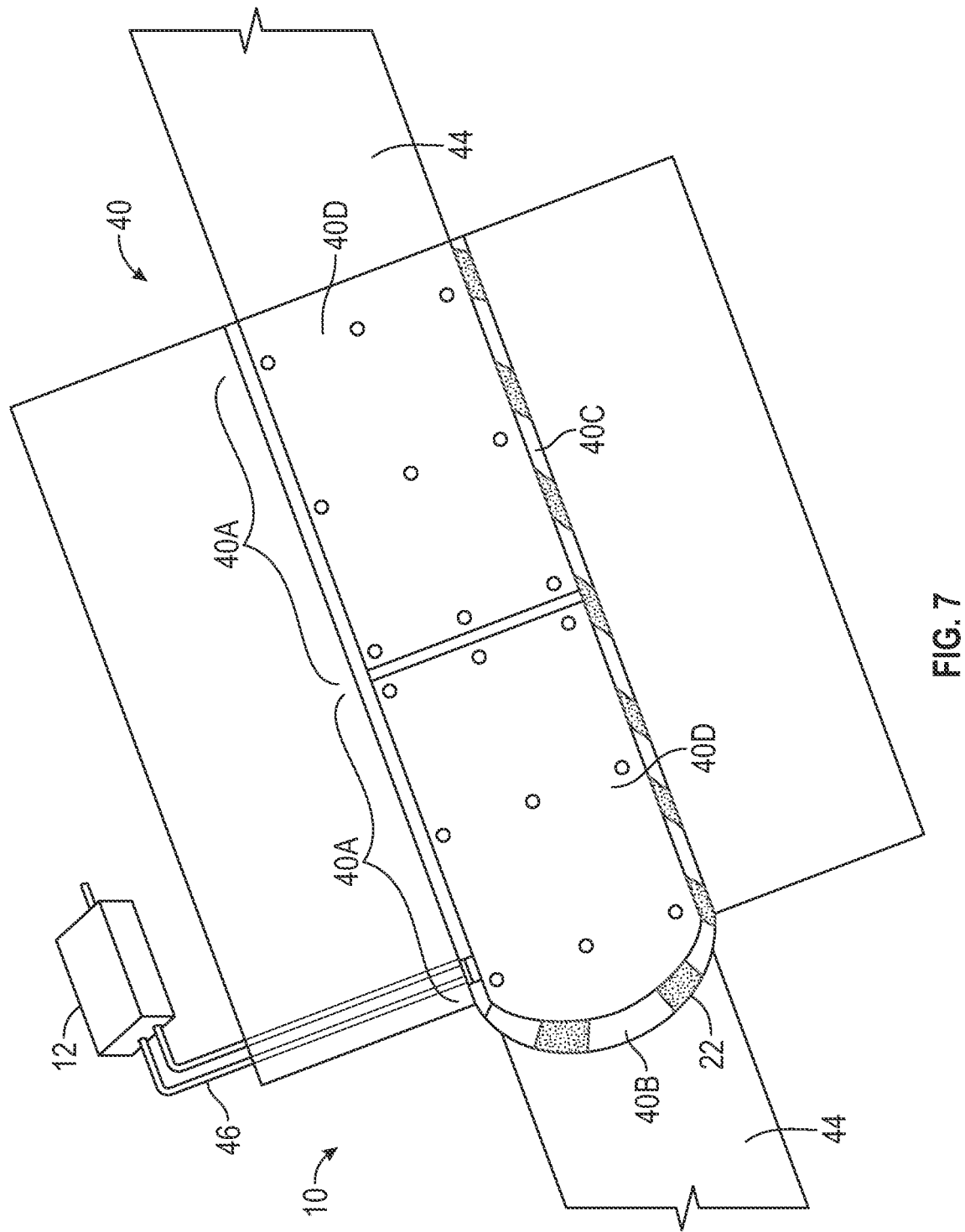
FIG. 7 is a diagrammatical illustration of a roadway used within a system for precision charging control of an untethered vehicle, in accordance with exemplary embodiments of the present disclosure.

The roadway 40 is described in further detail relative to FIGS. 6-8B. FIG. 6 is a diagrammatical illustration of a roadway 40 used within a system for precision charging control of an untethered vehicle 10, in accordance with exemplary embodiments of the present disclosure. FIG. 7 is a diagrammatical illustration of a roadway 40 used within a system for precision charging control of an untethered vehicle 10, in accordance with exemplary embodiments of the present disclosure. As shown in FIGS. 6-7, the roadway 40 may be positioned over an existing aggregate road surface 44, which may be a conventional road which is manufactured using known techniques and materials. For instance, the aggregate road surface 44 may be constructed from gravel, asphalt, concrete, or other similar materials. These types of road surfaces 44 are common in roads, highways, and other drivable, or traversable paths for automobiles, or other vehicle type(s).

One benefit of positioning the roadway 40 over an existing aggregate road surface 44 is the ability to increase the likelihood of adoption of the system 10 and decrease the construction required for implementation of the system 10. For example, implementation of the system 10 over an aggregate road surface 44 can allow the system 10 to be installed efficiently without tearing up existing roads or highways, which lessens the cost of implementing the system 10 and can increase the speed of which the system 10 can be useable. Additionally, when implemented over existing aggregate road surfaces 44, the system 10 can be installed on only a portion of the existing road, such as one lane of a 2, 3, 4, or 5 lane highway, such that the system 10 can have exposure to some users while allowing other drivers to remain on conventional road surfaces 44. Similar to how conventional freeways and highways have a high occupancy vehicle (HOV) lane, the roadway 40 of the present system 10 can be implemented as a distinct lane in a freeway or highway.

The roadway 40 can be constructed in many different forms. In one exemplary example, the roadway 40 is constructed as a modular roadway system which utilizes segmented components which can be attached to one another and assembled into an elongated structure on which a vehicle 20 (FIGS. 1-3) can be driven. For instance, each segment of the roadway 40 may be manufactured individually and have a certain length, such as 20 feet, 40 feet, or another length, whereby when the segments are connected end to end, they may form a roadway 40 which extends a significant distance, such as miles. Modularity of the roadway 40 may allow for individual segments to be constructed in a factory setting and installed on-site. FIG. 6 depicts the roadway 40 having two segments 40A which are connected together at an end, where these two segments 40A are positioned in series with an existing, aggregate road surface 44.

Additionally, modularity of the roadway 40 may allow for easy installation of other, associated components, such as, for example, entrance platforms 40B which may be used for locations where a vehicle moves from an existing, aggregate road surface 44 to the roadway 40 or side platforms 40C which are used at a side interface point between the roadway 40 and the existing, aggregate road surface 44. The roadway 40 may also include numerous other components, including those discussed relative to other figures. Also as shown in FIG. 6, the segments 40A of the roadway 40 may include a plurality of antennae 32 which are mounted to or within the roadway 40 segments 40A and positioned under a substantial entirety of the driving surface. For instance, the antennae 32 may be arranged in a pattern or distributed throughout all or most of the driving surface area of a segment 40A, as shown, such that the antennae 32 are positionable under a chassis and a tire and wheel assembly of the vehicle 20, as shown in FIG. 2, or in other designs, antennae 32 may be located in other positions or configurations. In one example, the antennae 32 may be integrated into, or onto, or within one or more flexible, semi-flexible, semi-rigid, or rigid substrates, e.g., pre-measured sheets or panels, which can be easily installed onto a modular roadway section such as within a protective housing or elsewhere within the modular section. It may also be possible to manufacture the antennae 32 to be infused directly onto one or more surfaces of the modular roadway 40. In another example, the antennae 32 maybe manufactured into attachable pieces to the roadway 40, such as by manufacturing them into tape, rolls, strips, or other similar structures which can be easily applied to the roadway 40.

The roadway 40 includes at least one wired connection 46 to a power source 12, such as a public or private electrical source, e.g., the grid, a generator, off-grid storage systems, etc. FIG. 7 illustrates the modular roadway 40 discussed relative to FIG. 6, but in FIG. 7, the segments 40A have a flush mounted surface plate 40D or cover which is positioned over the antennae 32 to thereby provide a driving surface for vehicles and to protect inner components of the roadway 40.

It is noted that the modularity of the roadway 40 may include an overlay on existing roads, as depicted relative to FIGS. 6-7, but it may also include other forms of modularity. For instance, the roadway 40 may be constructed as box sections which are built into a road, e.g., where segments 40A of the roadway 40 are installed flush, or below, or alongside an existing aggregate road surface 44, or another necessary, or feasible, or useful installation means or ways.

The roadway 40 when constructed modularly, may include a plurality of internal and/or external structural, and supporting elements, and a plurality of measured, and dimensional internal and/or external surface elements, such as channels, apertures, areas, tunnels, protrusions, flanges, compartments, or others, to form the desired structural design, and/or used to assemble, and protect, and provide proximity, and/or isolation, and/or insulation for the desired integrated devices or technologies. A protective housing of the modular roadway 40 may also be altered during the design and manufacturing process to form other desirable, or necessary, or feasible, or useful architectures, and/or structural designs that may be used to perform operations, functions, purposes, and/or tasks.

The structure components which form the modular roadway 40 components may include any type of known mechanical or electromechanical device or system, such as access ports, seals, fasteners, hermetically sealed doors, lids, plates, gates, portholes, hatches, or other apertures for easy ingress/egress to repair, replace, upgrade, maintain, and interchange the roadway 40 components. It may also be desirable for protective housings or cases of the roadway 40 to integrate various internal/external surface coatings of various materials that may be used to replicate, or improve existing road surface traction, and/or surface durability, and/or as reflective material, and/or electrically charged pixels, or crystals infused onto such a road surface for a corresponding associated laser light navigation device, and/or camera/video device, and/or communications device, and/or interactive road surface marking device, or another device. The modular components of the roadway 40 may be constructed with any known manufacturing technique using various materials. For instance, in one example may be possible to use recycled or recyclable plastic materials which provides sufficient structural strength and durability, while being as environmentally friendly and sustainable as possible. Plastic materials or polymer may be made of interlocking monomers—(2DPA-1), and/or other known or developed polymer compositions.

Figure 8A:
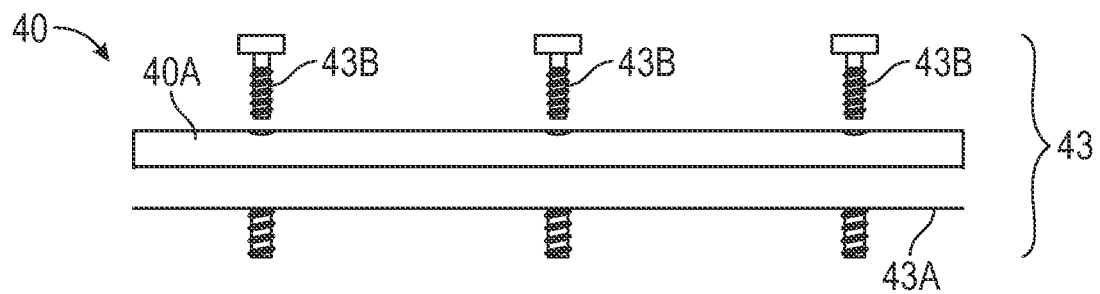
FIGS. 8A-8B are diagrammatical illustrations of a roadway used within a system for precision charging control of an untethered vehicle, in accordance with exemplary embodiments of the present disclosure.
Figure 8B:
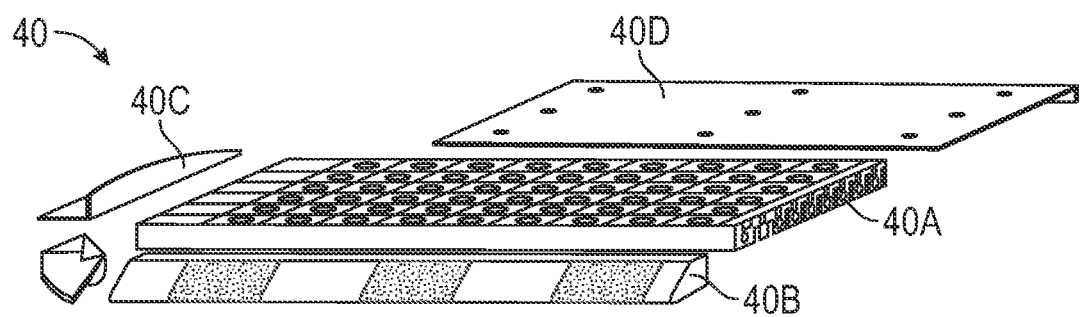

FIGS. 8A-8B are diagrammatical illustrations of a roadway 40 used within a system for precision charging control of an untethered vehicle 10, in accordance with exemplary embodiments of the present disclosure. In particular, FIG. 8A illustrates an anchoring system 43 for use with the roadway 40, where the anchoring system 43 is used to hold or retain the roadway 40 to an existing aggregate road surface. As shown, the anchor system 43 may include anchor points 43A which are installed into an existing aggregate road surface, where a segment 40A of the roadway 40 is positionable over the anchor points 43A. One or more anchor pins 43B may then be used to secure the segment 40A to the anchor points 43A, such as where the anchor pins 43B are driven through a hole within the segment 40A until they connect with the anchor points 43A underneath. With the anchor pins 43B held in place in the anchor points 43A, the segment 40A of the roadway 40 may be retained in a substantially stationary position. A variety of other structures may also be used to retain the roadway 40 in place. For example, brackets connecting segments 40A together, snap fittings, fasteners, or other structures can be used in place of the anchoring system 43 or ideally, with the anchoring system 43.

It is also noted that certain uses of the system 10 may not utilize any anchoring system or require anchoring, such as temporary installations where long term movement of the roadway 40 is not a concern. For instance, temporary installations of a roadway 40 may include emergency installations, or uses (such as disaster relief), military installations, or uses, industrial sites, or uses, commercial sites, or uses, entertainment venues, or uses, or other similar settings, or uses that may only require the use of the system 10 for hours or days, such that anchoring is unnecessary. While the use of anchoring systems may depend on the intended use of the system 10, it is commonly seen with more permanent installations of the system 10, such as for automobiles, or trucks, or busses and/or other wheeled vehicles on highways, or roadways, or use surfaces, and/or other wheeled vehicles types within factories, or on the tarmac of airports, or on golf course paths, or on bicycle paths, or in other settings where there is long-term vehicular use along one or more paths etc., and/or for other necessary, or feasible, or useful reasons, or uses.

FIG. 8B illustrates an exploded view of a modular implementation of the roadway 40. As shown, the roadway 40 includes a segment 40A which may be interconnected with other segments (not shown). An entrance platform 40B may have an incline shape thereby allowing vehicles to enter the roadway 40. One or more side platforms 40C may be used on a side edge of the segment 40A, which may be used as a transitional platform of ingress, or egress at any point along the plain of the roadway 40, preventing a hazardous entrance or exit for a vehicle 20 driving on, or off the edge(s) while traversing the segment 40C.

A surface plate 40D is used to cover a top portion, or another usable portion of the roadway segment or side platforms, or attached or attachable transitional modular inclined pieces 40A, thereby enclosing the antennae 32 and other components of the segment 40A which may be susceptible to damage from vehicles and environmental factors such as dirt, grease, grime, mud, liquids etc. Such a surface plates may be held in place with the use of one or more fasteners, seals, and other sealing materials so as to form a hermetic seal when locked in-place. Additionally, the surface plates 40D may be easily removable, through the use of one or more fasteners, or hinges, or hydraulic extensions, or springs or other means or materials to allow ready access to the antennae 32 or other components, such that they can be easily accessed for repair or replacement or upgrading at any time without damaging the modular road piece, and without any excavation and repaving processes as would be necessary with in-ground binary WPT systems. Such a surface plates may be textured on the exposed surface through the use of materials and manufacturing processes.

It is noted that various structures of the roadway 40 may also be used for triggering or activating functionality of the system 10. For instance, the entrance platform, or transitional modular attached, or attachable pieces may be inclined in form and installed throughout a modular road segment 40B and may be used as a triggering point for when a vehicle goes on or off the roadway 40, thereby identifying when the vehicle enters or exists use of the system 10. The entrance platform and/or transitional inclined modular pieces 40B may include circuits, and/or sensors, and/or antennae, and/or lighting, and/or power sources, and/or controls, and/or similar components, such as those used in the authentication connection, to identify, or communicate with, or between the vehicle before, when and while entering, or exiting, or traversing the roadway, and/or other components as may be necessary, or feasible, or useful. It is also possible for the segments 40B, or other segments, to be positioned offset from a position of the start of the roadway 40 as well, such that the segment 40B gives an advance warning that the modular roadway 40 is in close proximity. For instance, the segment 40B could effectively be implemented in a position a distance before the roadway 40, such as hundreds or thousands of feet, where it acts as a beacon to the roadway 40 before the road starts, or as a warning, or messaging to the driver that the roadway 40 will start soon, and/or for other messaging reasons, means, or ways such as pending hazards "slow down", or "proceed with caution", or "stop" etc., and/or for other necessary, or feasible, or useful interactive communications, and/or information between, or for, or with a driver, and/or vehicle, and/or antennae, and/or systems about to enter, or travers the roadway. The segment 40B can be integrated or positioned into, or onto the aggregate road surface in any manner, such as being positioned below, within, alongside, or on top of the aggregate road surface, and/or another necessary, or feasible, or useful placements, and/or positions. Installation of segment 40B may use similar techniques and materials such as those described for the roadway 40, and/or use other necessary, or feasible, or useful installation methods, techniques, materials, components, and/or architectures.

From a use perspective, the entrance platform and/or transitional inclined modular pieces 40B may provide a visual, or tactile reference to drivers, showing the interface between a conventional road and the roadway 40 with electrical charging capabilities. This visual, or tactile reference may be enhanced through surfaces colors, color lighting, flashing or other lighting modality, digital signage, surface textures, or other indicators. For instance, in one example, the entrance platform and/or transitional inclined modular pieces 40B may have white and black alternating colors, and various surface textures and/or flashing lights all inclusive. Additionally, from another use perspective, such transitional attached and/or attachable modular inclined pieces may be formed as a curb or another usable forms that may be installed along, or throughout sections of the modular roadway, or path, or other conventional aggregate road surfaces, or circuits, or tarmacs. For example, they may be associated with such a modular roadway, or associated with such an equipped authenticated vehicles to provide pre-trigger, trigger, and/or post-trigger activation of any associated functionalities.

Figure 9:
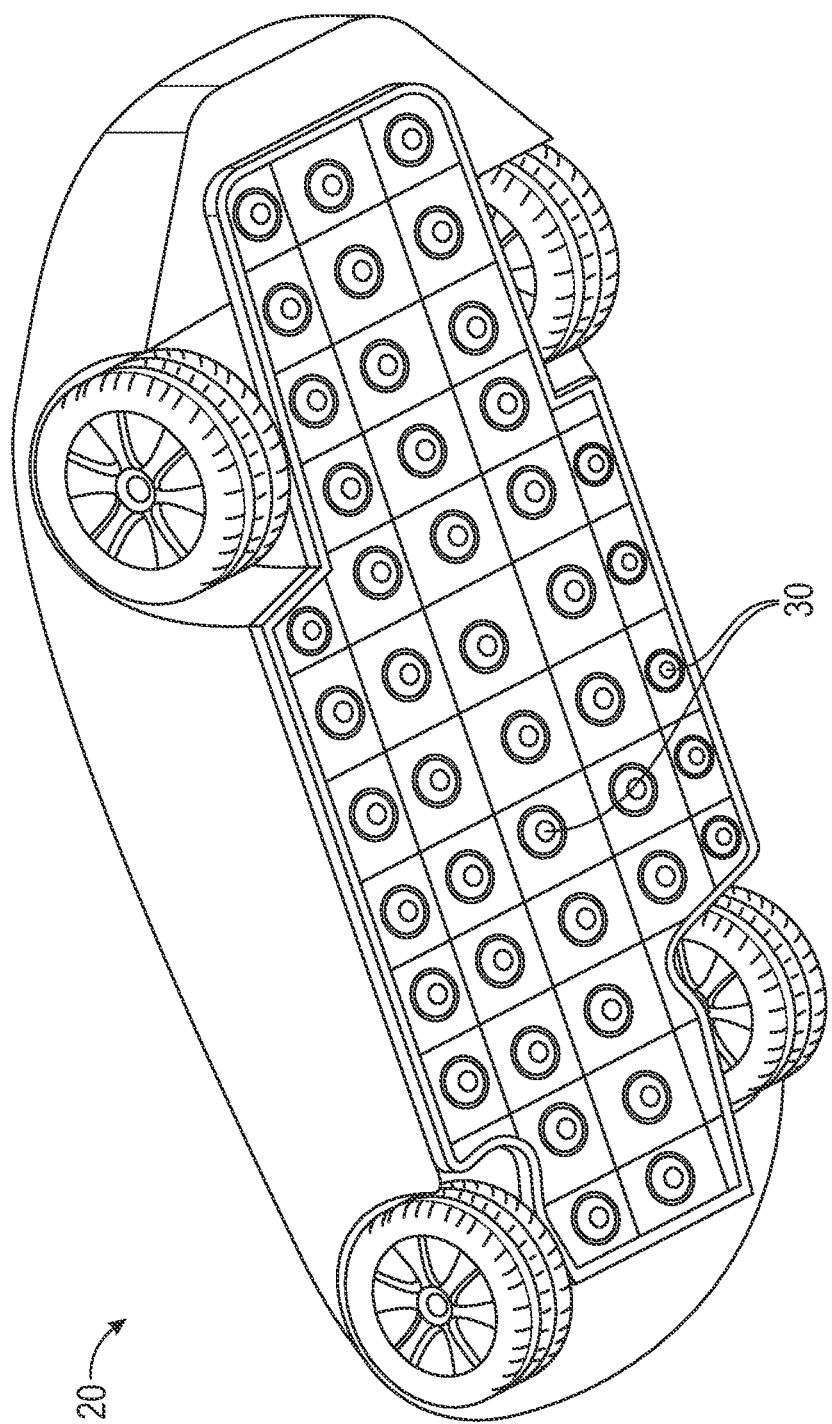
FIG. 9 is a diagrammatical illustration of a vehicle used within a system for precision charging control of an untethered vehicle, in accordance with exemplary embodiments of the present disclosure.
Figure 10:
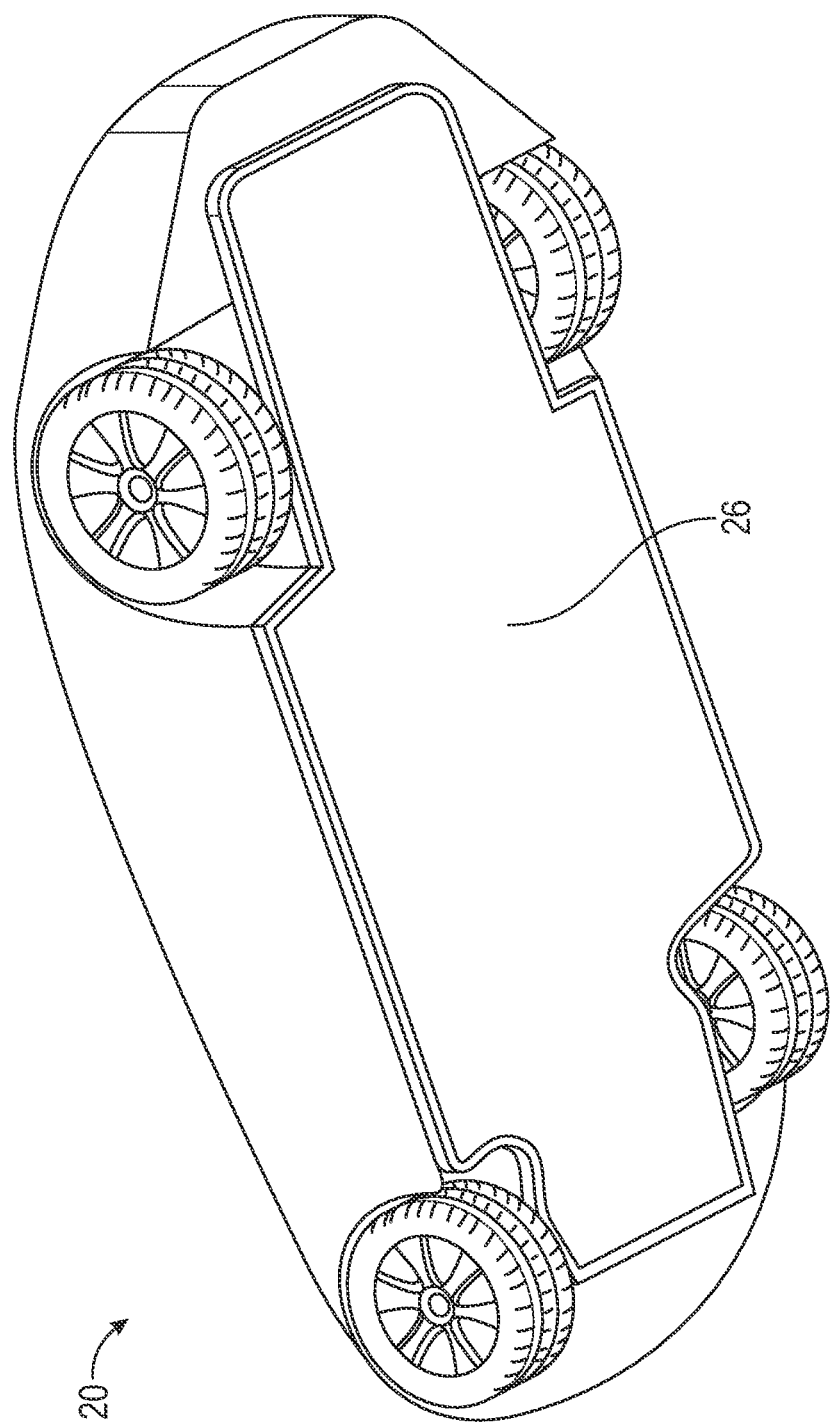
FIG. 10 is a diagrammatical illustration of a vehicle used within a system for precision charging control of an untethered vehicle, in accordance with exemplary embodiments of the present disclosure.

The vehicle 20 is described in further detail relative to FIGS. 9-10, where FIG. 9 and FIG. 10 are diagrammatical illustrations of a vehicle used within a system for precision charging control of an untethered vehicle, in accordance with exemplary embodiments of the present disclosure. As shown in FIG. 9, the vehicle 20 may be a four-wheeled automobile with a plurality of antennae 30 positioned along a bottom of the vehicle 20. In this example, the antennae 30 may be located along a large surface area of the bottom of the vehicle 20, thereby allowing for a larger area of coverage of connection between the antennae 30 on the vehicle 20 and the antennae 32 on the roadway 40, as shown in FIGS. 6-8B. While not shown specifically, the antennae 30 on the vehicle 20 may also be positioned internal to the vehicle 20, such as within bumpers, rocker panels, tires, wheels, or other places. FIG. 10 illustrates the vehicle 20 of FIG. 8 with a protective cover plate 26, such as a portion of the housing compartment 24 of FIG. 2, being positioned over the antennae 30 to protect them from hazards or damage while the vehicle 20 is in motion.

The tire and wheel assembly 22 (FIGS. 1-2) are described in further detail relative to FIGS. 11-16, where FIGS. 11-16 are various diagrammatical illustrations of a tire and wheel assembly used within a system for precision charging control of an untethered vehicle, in accordance with exemplary embodiments of the present disclosure. With references to FIGS. 1-2 and 6-8B, in combination with FIGS. 11-16, the tire and wheel assembly 22 may be advantageously used to house antennae 30, transfer electrical power to or from the vehicle 20, or perform other functionality in the system 10 due to the tire's position in contact with the roadway 40 when in use. In certain situations, it may be desirable for the antennae 30 to be positioned as close as possible to the antennae 32 within the roadway 40 which may help ensure a more reliable wireless connection or better energy transfer between the antennae 30, 32. To achieve this positioning, antennae 30 can be mounted within the tire and wheel assembly 22 since it will have a closer positioning to the roadway 40 than other parts of the vehicle 20.

It is noted that the system 10 may include fully functional communication capabilities between the various components thereof, including the antennae 30, 32, the vehicle 20, the roadway 40, and the tire and wheel assembly 22, such that any of these components, or others, can be in communication with one another. Various communication architecture may be used to enable communication between the components, all of which is considered within the scope of the present disclosure.

Figure 11:
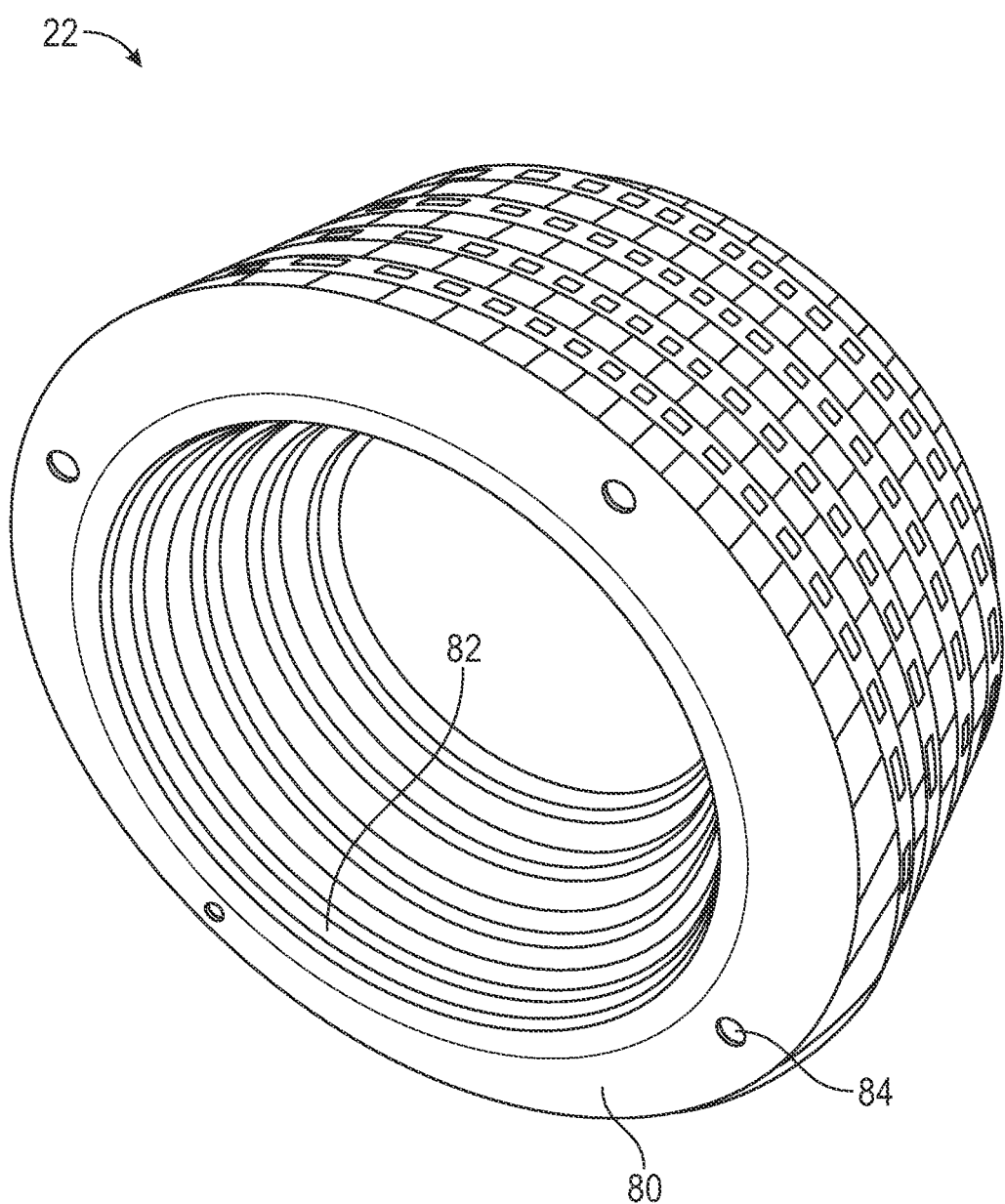
FIGS. 11-16 are various diagrammatical illustrations of a tire and wheel assembly used within a system for precision charging control of an untethered vehicle, in accordance with exemplary embodiments of the present disclosure.

In FIG. 11, just the tire 80 of the tire and wheel assembly 22 is depicted, where the tire 80 has interior ridges 82 which may be used to hold or house antennae 30 (not shown) positioned within the tire 80. For instance, the antennae 30 may be mounted to the interior surface of the tire 80, and/or attachable housing compartments with various fasteners or configurations, such that they directly contact the tire 80 which itself contacts the roadway 40 during operation of the vehicle 20. Additionally, FIG. 11 depicts sensors 84 which may be mounted to a sidewall of the tire 80 and are in communication with antennae 30, where these sensors 84 can interact with the control system 70 of the system 10 to aid in sensing or determining a positioning of the vehicle 20 on the roadway 40 during operation. For instance, the sensors 84 on the tire 80 may include a light emitting diode (LED) which is used to optically trigger a sensor 36 (FIGS. 1-2) on or in the roadway 40. It is also noted that the sensors 84 may be positioned on other parts of the tire 80, such as the circumference or tread of the tire 80, or the wheel or rim of the tire and wheel assembly 22.

While the sensors 84 may be implemented with various types of sensing devices, such as optical or electromagnetic sensors, it may also be possible for the sensors 84 to include illumination capabilities. For example, the sensors 84 may include or contain one or more LEDs which are positioned on an exterior of the vehicle to provide illumination of the tire and wheel assembly 22, such that while the vehicle is in motion on the roadway an external viewer can visually identify the light emitted from the sensors 84 as a visual indicator of the charging function. For instance, the LEDs could flash, emit, or pulse light as a visual indicator of a charging status or provide a warning light pattern to indicate the status or function of other events within the system 10. This can be used to warn the external viewer of the electricity flux exposure generated during the charging function which unintentionally radiates to the external viewer when in close proximity to the roadway or the vehicle during the transfer of the quantity of electrical energy, as previously noted.

Figure 12:
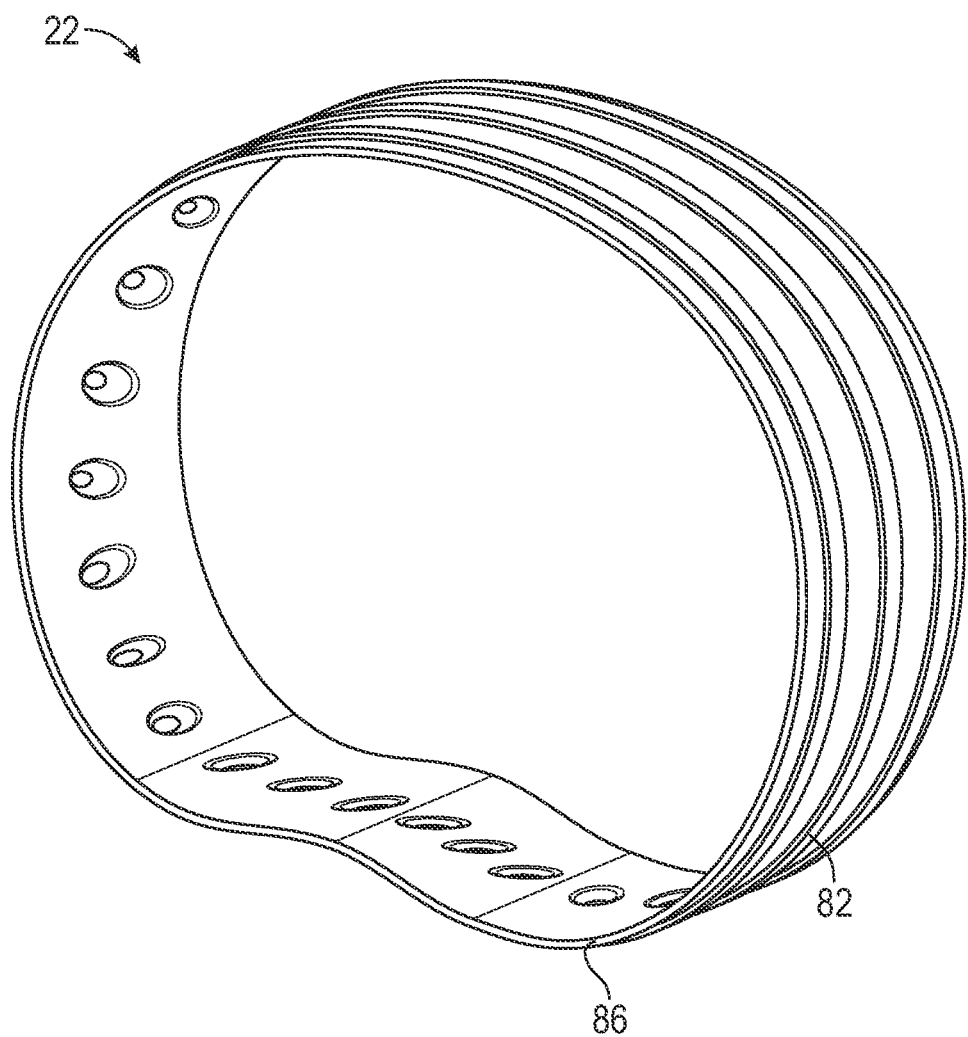
Figure 13:
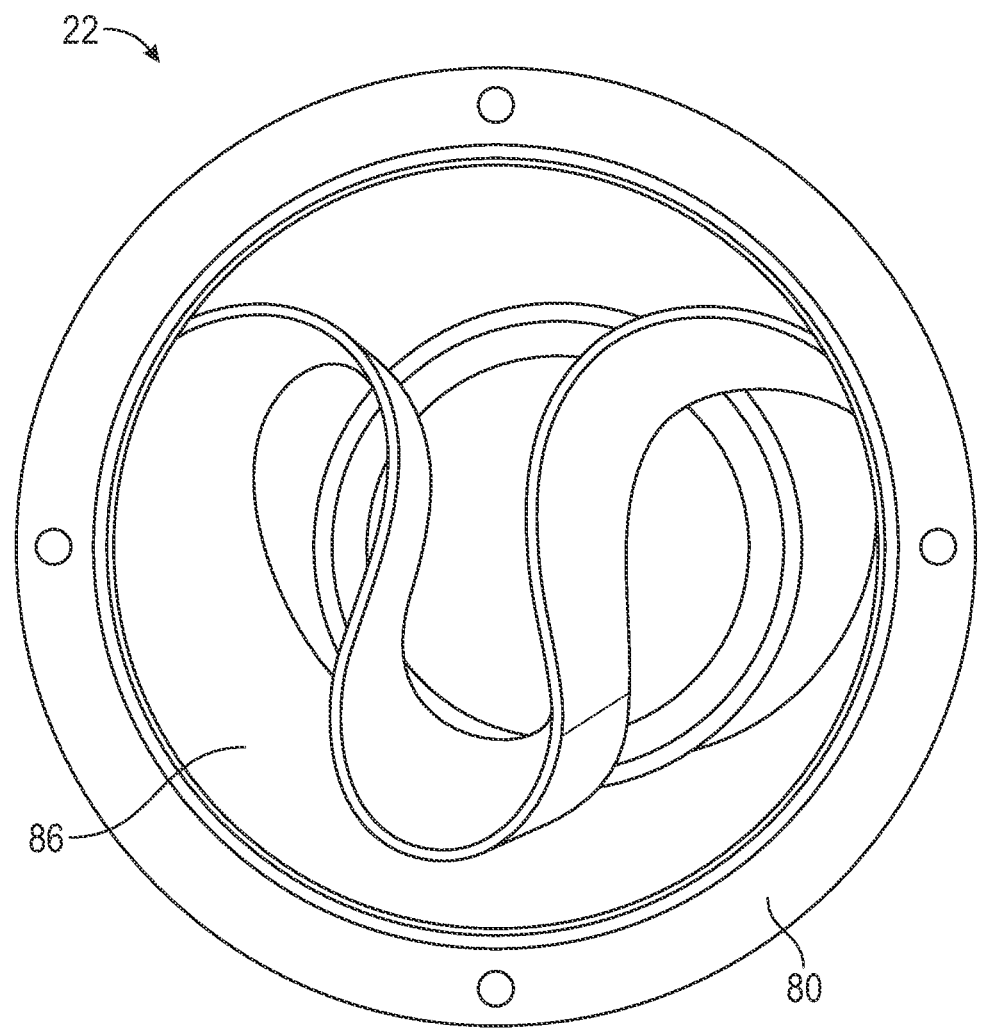
Figure 14:
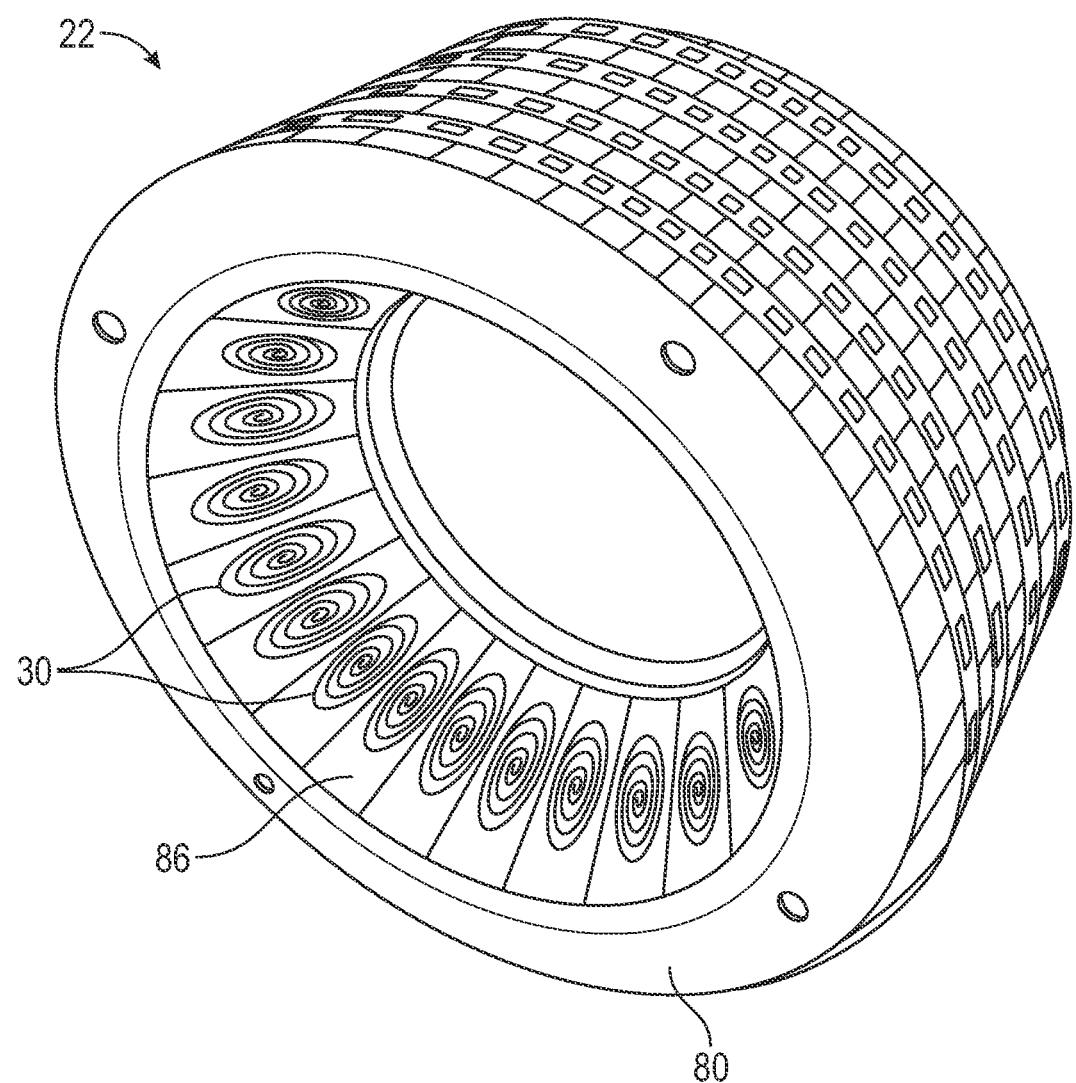

Instead of mounting antennae 30 to interior ridges 82 of a tire 80, or in addition to antennae 30 mounted in this fashion, it may also be possible to use a liner which aids in mounting antennae 30 within the tire 80. For example, FIG. 12 depicts a housing liner 86 which may be positioned in the interior of the tire 80, and which has a plurality of ridges 82 which can be used to locate antennae 30 therein. This liner 86 may help with installation of the antennae 30 in the tire 80 and/or retaining the antennae 30 in a proper position within the tire 80 during vehicle operation. FIG. 13 illustrates the liner 86 with antenna 30 being positioned within the tire 80 and FIG. 14 illustrates the liner 86 positioned within an interior of the tire 80, where the antennae 30 can be seen in position around an inner circumference of the tire 80.

Figure 15:
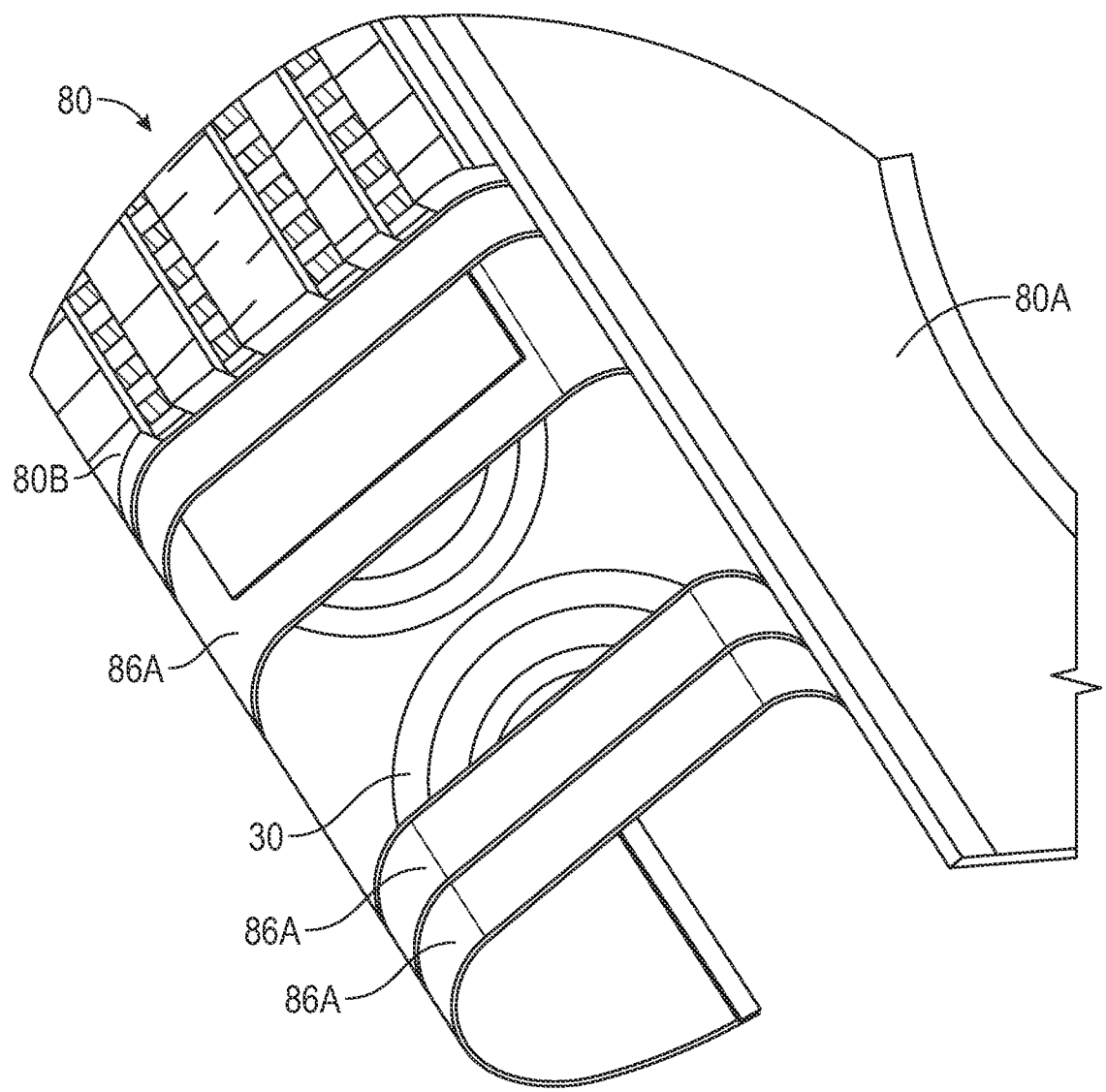

FIG. 15 is a cutaway illustration of the tire 80 showing the components which may be used to mount antennae 30 within the tire 80. For example, as shown, the tire 80 includes a sidewall 80A and a tread 80B which are the exposed, exterior portions of the tire 80. The liner 86 may have various ply layers 86A, such as an exterior ply which is the outermost surface within the interior of the cavity of the tire 80, one or more middle ply, and an innermost ply which is in contact with the interior surface of the tire 80. One or more of the plys may have the antenna 30 mounted thereto, such that the antennae 30 are retained in a position directly or indirectly against an underside of the tread 80B of the tire 80. There may be numerous different variations and configurations for mounting the antennae 30 to an interior of the tire 80 beyond what is disclosed or discussed here, all of which are considered within the scope of the present disclosure.

Figure 16:
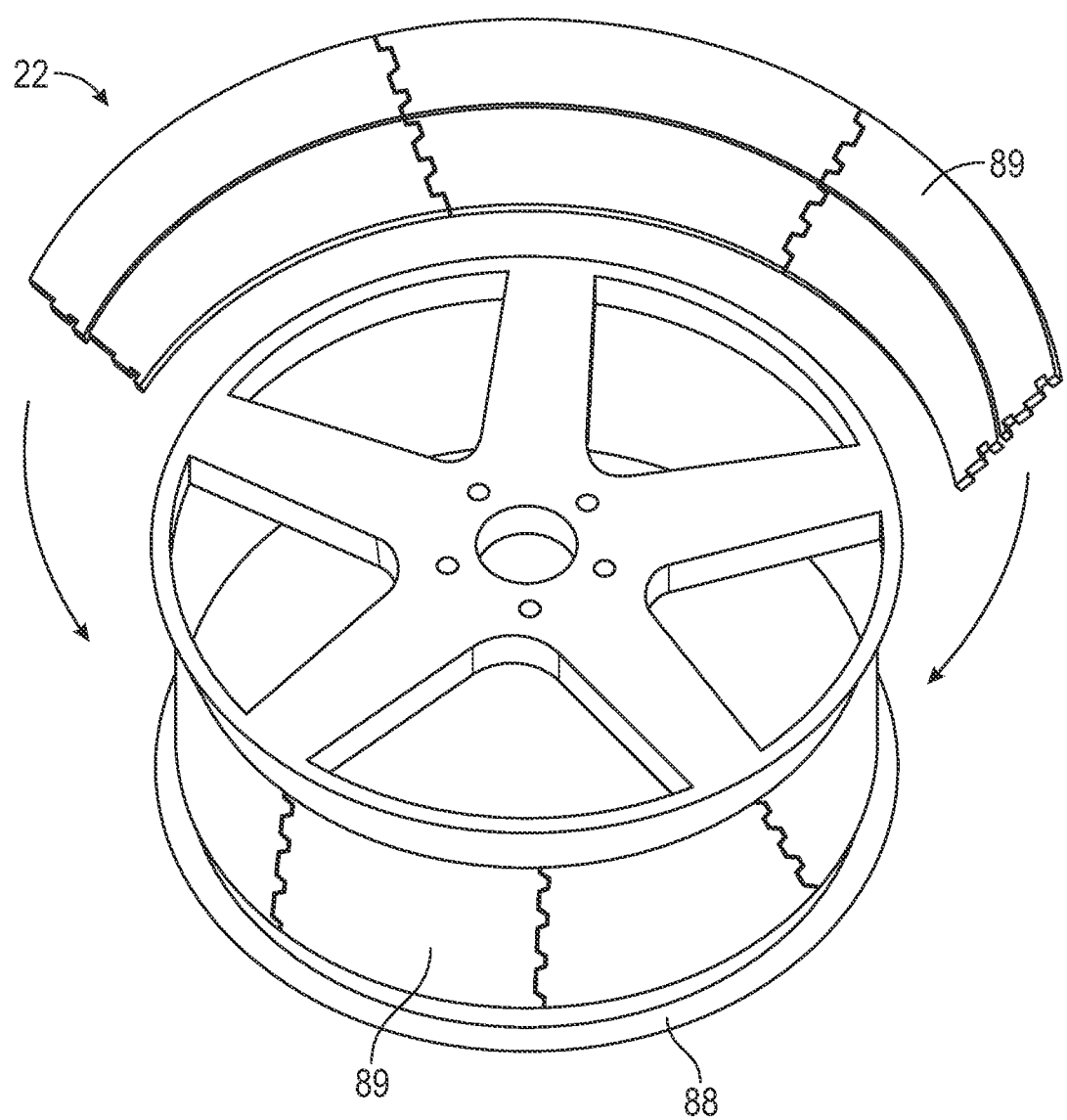

FIG. 16 is a partial exploded view of a rim 88 of the tire and wheel assembly 22 which shows an exemplary illustration of a modular housing case in use with the rim 88. As shown, a portion of a housing case 89 is positioned on the rim 88 while another portion (at the top of FIG. 16) is depicted being off the rim 88. The housing case 89 may be formed from modular segments which can be connected together to substantially encircle the rim 88, along an interior thereof, such that the housing case 88 does not interfere with mounting of the tire 80. The housing case 89 may be used to house or enclose components of the system 10, such as antennae or electrical transfer components. For instance, if antennae 30 are mounted along the tire 80, the housing case 89 may be used to transfer the electrical energy received by the antennae 30 to a battery or propulsion system of the vehicle 20.

It should be understood that the system 10 can function by providing electrical energy to various components of a vehicle 20. In one example, the vehicle 20 may not carry or use a battery, or may not have a power storage system, but instead rely on direct electrical power connections to a propulsion system of the vehicle 20. In another example, the vehicle 20 may integrate a smaller storage system, such as an efficient single battery, which can store enough electricity for limited mileage ranges when it is not connected to a power supply. In another example, the vehicle 20 may include a sophisticated battery storage system, such as a DC fast charging system, or battery bank which is capable of sufficient electricity storage to allow the vehicle 20 to have an extended range. Other examples may also be used, where the vehicle 20 has any other type of electrical storage capacity.

While FIGS. 11-16 depict portions of the tire and wheel assembly 22 which may be used with the system 10, it is noted that any variations or alternative configurations may also be used, all of which are considered within the scope of the present disclosure.

The roadway 40 and/or the tire and wheel assembly 22, and/or protective housing cases type(s) thereof, or therein, or thereto may further include various surface finishes or other materials to increase the performance of the components or minimize the impact on this surrounding environment. For instance, the tire and wheel assemblies 22, may be provided with a coating, such as a protective sealants, adhesives, coatings, finishes, paints, tints, that are injected daubed, sprayed, applied, spread, distributed with the use of various application techniques for the purpose of protecting against corrosion, wear and tear, when exposed to various atmospheric, temperatures, meteorological (weather) conditions, and other elements, i.e., air, rain, snow, ice, heat, cold, dirt, sand, grease, grime, fluids, or surfaces. Similarly, the roadway 40 may be implemented with an insulation material, such as a which may be important for suppressing unwanted sounds, such as noise that can reverberate within the cavity of the modular roadway 40 units while a vehicle 40 is traversing. Insulation may be used to suppress unwanted sounds, or vibrations due to hollowed interior cavities of modular roadway 40 pieces, as well as used for heat shielding and/or as mitigation for static electricity, or for other insulating purposes. Insulation can be used as an isolation method between components, or for added protection against electrical shock between or throughout electrical wiring, and/or to fit and hold components in-place. Additionally, it may be possible to use coatings and materials applied to the exposed surfaces of the roadway 40 units, the tire and wheel assemblies 22, or other components of the system 10, as protection from outside elements, or for anti-static, or to emulate an aggregate texture onto the plastic road surface for increased traction and added safety in all weather conditions or for other reasons as is necessary, feasible, or useful.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method of precision charging control of a vehicle in motion on a modular roadway, the method comprising:

providing at least one first wireless charging antenna carried by the vehicle, the at least one first wireless charging antenna in electrical communication with a vehicle propulsion system;

providing a plurality of second wireless charging antennae positioned within a modular roadway under a substantial entirety of a driving surface of the modular roadway, whereby the plurality of second wireless charging antennae are positionable under at least one of a body or chassis of the vehicle, and a tire and wheel assembly of the vehicle, and wherein the modular roadway is positioned entirely over all layers of an aggregate road surface, the plurality of second wireless charging antennae being in communication with at least a roadway control system and a power source;

establishing an authentication connection between the at least one first wireless charging antenna and the roadway control system, wherein the authentication connection includes at least one identification marker of at least one of the at least one first wireless charging antenna or the vehicle;

triggering, by at least one of the at least one first wireless charging antenna or one of the plurality of second wireless charging antennae, a dynamic seek operation between the at least one first wireless charging antenna and the one of the plurality of second wireless charging antennae to pair the at least one first wireless charging antenna with the one of the plurality of second wireless charging antennae;

transferring a quantity of electrical energy between the at least one first wireless charging antenna and the one of the plurality of second wireless charging antennae; and during the transfer of the quantity of electrical energy between the at least one first wireless charging antenna and the one of the plurality of second wireless charging antennae and while the vehicle is in motion on the roadway, illuminating one or more LEDs positioned on an exterior of the vehicle to provide an external viewer a visual indicator of a charging function of the vehicle in motion to thereby warn the external viewer of electricity flux exposure generated during the charging function which unintentionally radiates to the external viewer when in close proximity to the roadway or the vehicle during the transfer of the quantity of electrical energy.

2. A method of precision charging control of a vehicle, the method comprising:

providing a plurality of first wireless charging antennae carried by the vehicle, wherein at least a first portion of the plurality of first wireless antennae is positioned within one or more tire and wheel assemblies of the vehicle, and at least a second portion of the plurality of first wireless antennae is positioned on at least one of a body or chassis of the vehicle, the plurality of first wireless charging antennae in electrical communication with a vehicle propulsion system;

providing a plurality of second wireless charging antennae positioned on or within a roadway, the plurality of second wireless charging antennae being in communication with at least a roadway control system and a power source;

establishing an authentication connection between at least one of the plurality of first wireless charging antennae and the roadway control system;

while the vehicle is in motion on the roadway, triggering, by the at least one of the plurality of first wireless charging antennae or one of the plurality of second wireless charging antennae at a first location of the roadway, a dynamic seek operation between the at least one of the plurality of first wireless charging antennae and the one of the plurality of second wireless charging antennae at the first location of the roadway to pair the at least one of the plurality of first wireless charging antennae with the one of the plurality of second wireless charging antennae, wherein the dynamic seek operation uses one or more signals communicated between one or more vehicle sensors in communication with the plurality of first wireless charging antennae and one or more roadway sensors in communication with one of the plurality of second wireless charging antennae;

determining, based on the one or more signals of the dynamic seek operation, a position of the vehicle in motion during the dynamic seek operation, and calculating a time when the second portion of the plurality of first wireless charging antennae positioned on the at least one of the body or chassis of the vehicle in motion will be positioned proximate to the first location of the roadway corresponding to the one of the plurality of second wireless charging antennae;

transferring a quantity of electrical energy between the second portion of the plurality of first wireless charging antennae and the one of the plurality of second wireless charging antennae at the time when the second portion of the first wireless charging antennae positioned on the at least one of the body or chassis of the vehicle in motion is positioned proximate to the first location of the roadway corresponding to the one of the plurality of second wireless charging antennae;

adaptively controlling the transfer of the quantity of electrical energy between the one of the plurality of second wireless charging antennae and the first portion or second portion of the plurality of first wireless antennae based on a proximity of the vehicle relative to people or agriculture, wherein when the vehicle is positioned proximate to people or agriculture, the quantity of electrical energy is switched to be transferred to the first portion of the plurality of first wireless antennae positioned within the one or more tire and wheel assemblies of the vehicle to thereby lessen electricity flux exposure to the people or agriculture which is generated during the transfer of the quantity of electrical energy; and during the transfer of the quantity of electrical energy between the at least one of the plurality of first wireless charging antennae and the one of the plurality of second wireless charging antennae and while the vehicle is in motion on the roadway, illuminating one or more LEDs positioned on an exterior of the vehicle to provide an external viewer a visual indicator of a charging function of the vehicle in motion to thereby warn the external viewer of the electricity flux exposure generated during the charging function which unintentionally radiates to the external viewer when in close proximity to the roadway or the vehicle during the transfer of the quantity of electrical energy.

3. The method of claim 2, wherein the roadway further comprises a modular roadway, the modular roadway having a plurality of segments connectable together to form a driving surface, wherein the plurality of second wireless charging antennae are positioned within the modular roadway under a substantial entirety of the driving surface, thereby positionable under the at least one of the body or chassis of the vehicle, and the one or more tire and wheel assemblies of the vehicle.

4. The method of claim 3, wherein the road surface of the modular roadway is positioned entirely over all layers of an aggregate road surface, whereby at least one anchor pin connects one or more segments of the modular roadway with one or more layers of the aggregate road surface.

5. The method of claim 2, wherein the dynamic seek operation is triggered by both one or more of the plurality of first wireless charging antennae and one or more of the plurality of second wireless charging antennae.

6. The method of claim 2, wherein the one of the plurality of second wireless charging antennae at the first location is determined by at least one of:
a pressure sensor within the roadway;
a proximity sensor within the roadway;
an acoustic signal communicated between the plurality of first wireless charging antennae and one of the plurality of second wireless charging antennae; or
a magnetic signal communicated between the plurality of first wireless charging antennae and one of the plurality of second wireless charging antennae.

7. The method of claim 2, wherein the dynamic seek operation uses historical data of the vehicle to generate a prediction about a future vehicle location on the roadway.

8. The method of claim 2, wherein a size or a duration of the quantity of electrical energy between the first or second portions of the first wireless charging antennae and the one of the plurality of second wireless charging antennae is dependent on a type of the vehicle.

9. A system for precision charging control of a vehicle comprising:

at least a plurality of first wireless charging antennae carried by the vehicle, wherein at least a first portion of the plurality of first wireless antennae is positioned within one or more tire and wheel assemblies of the vehicle, and at least a second portion of the plurality of first wireless antennae is positioned on at least one of a body or chassis of the vehicle, wherein the plurality of first wireless charging antennae is in electrical communication with a vehicle propulsion system;

a plurality of second wireless charging antennae positioned on or within a roadway, wherein the plurality of second wireless charging antennae is in communication with at least a roadway control system and a power source; and a control system module of the vehicle establishing an authentication connection between at least one of the plurality of first wireless charging antennae and the roadway control system;

wherein a dynamic seek operation is triggered by the at least one of the plurality of first wireless charging antennae or one of the plurality of second wireless charging antennae between the at least one of the plurality of first wireless charging antennae and the one of the plurality of second wireless charging antennae positioned at a first location of the roadway, wherein the dynamic seek operation is triggered while the vehicle is in motion on the roadway, wherein the dynamic seek operation pairs the at least one of the plurality of first wireless charging antennae with the one of the plurality of second wireless charging antennae, wherein the dynamic seek operation uses one or more signals communicated between one or more vehicle sensors in communication with the plurality of first wireless charging antennae and one or more roadway sensors in communication with one of the plurality of second wireless charging antennae, and wherein, based on the one or more signals of the dynamic seek operation, a position of the vehicle in motion during the dynamic seek operation is determined, and a time when the second portion of the plurality of first wireless charging antennae positioned on the at least one of the body or chassis of the vehicle in motion will be positioned proximate to the first location of the roadway corresponding to the one of the plurality of second wireless charging antennae is calculated;

wherein a quantity of electrical energy is transferred between the second portion of the plurality of first wireless charging antennae and the one of the plurality of second wireless charging antennae at the time when the second portion of the first wireless charging antennae positioned on the at least one of the body or chassis of the vehicle in motion is positioned proximate to the first location of the roadway corresponding to the one of the plurality of second wireless charging antennae;

wherein the transfer of the quantity of electrical energy between the one of the plurality of second wireless charging antennae and the first portion or second portion of the plurality of first wireless antennae is adaptively controlled based on a proximity of the vehicle relative to people or agriculture, wherein when the vehicle is positioned proximate to people or agriculture, the quantity of electrical energy is switched to be transferred to the first portion of the plurality of first wireless antennae positioned within the one or more tire and wheel assemblies of the vehicle to thereby lessen electricity flux exposure to the people or agriculture which is generated during the transfer of the quantity of electrical energy; and wherein during the transfer of the quantity of electrical energy between the at least one of the plurality of first wireless charging antennae and the one of the plurality of second wireless charging antennae and while the vehicle is in motion on the roadway, one or more LEDs positioned on an exterior of the vehicle is illuminated to provide an external viewer a visual indicator of a charging function of the vehicle in motion to thereby warn the external viewer of the electricity flux exposure generated during the charging function which unintentionally radiates to the external viewer when in close proximity to the roadway or the vehicle during the transfer of the quantity of electrical energy.

10. The system of claim 9, wherein the roadway further comprises a modular roadway, the modular roadway having a plurality of segments connectable together to form a driving surface, wherein the plurality of second wireless charging antennae are positioned within the modular roadway under a substantial entirety of the driving surface, thereby positionable under the at least one of the body or chassis of the vehicle, and the one or more tire and wheel assemblies of the vehicle.

11. The system of claim 10, wherein the road surface of the modular roadway is positioned entirely over all layers of an aggregate road surface, whereby at least one anchor pin connects one or more segments of the modular roadway with one or more layers of the aggregate road surface.

12. The system of claim 9, wherein the dynamic seek operation is triggered by both one or more of the plurality of the first wireless charging antennae and one or more of the plurality of second wireless charging antennae.

13. The system of claim 9, wherein the one of the plurality of second wireless charging antennae at the first location is determined by at least one of:
 a pressure sensor within the roadway;
 a proximity sensor within the roadway;
 an acoustic signal communicated between the plurality of first wireless charging antennae and one of the plurality of second wireless charging antennae; or
 a magnetic signal communicated between the plurality of first wireless charging antennae and one of the plurality of second wireless charging antennae.

14. The system of claim 9, wherein the dynamic seek operation uses historical data of the vehicle to generate a prediction about a future vehicle location on the roadway.

15. The system of claim 9, wherein a size or a duration of the quantity of electrical energy between the first or second portions of the first wireless charging antennae and the one of the plurality of second wireless charging antennae is dependent on a type of the vehicle.

* * * * *